United States Patent
Shiina et al.

[11] Patent Number: 6,040,827
[45] Date of Patent: Mar. 21, 2000

[54] DRIVER CIRCUIT, DRIVER INTEGRATED CIRCUIT, AND DISPLAY DEVICE AND ELECTRONIC DEVICE USING THE DRIVER CIRCUIT AND DRIVER INTEGRATED CIRCUIT

[75] Inventors: Kazuhiro Shiina; Koji Kawamoto; Masato Miura, all of Hitachi; Hitoshi Ohura, Mito; Shoichi Ozeki, Hitachi; Noboru Akiyama, Hitachinaka; Kunihoro Nunomura, Hitachi; Minehiro Nemoto, Hitachi; Masahiro Iwamura, Hitachi, all of Japan

[73] Assignees: Hitachi, Ltd., Tokyo; Hitachi Haramachi Electronics Co., Ltd., Ibaraki, both of Japan

[21] Appl. No.: 08/890,994

[22] Filed: Jul. 10, 1997

[30] Foreign Application Priority Data

Jul. 11, 1996 [JP] Japan .................................... 8-181870
Aug. 22, 1996 [JP] Japan .................................... 8-220993

[51] Int. Cl.⁷ ....................................................... G09G 5/00
[52] U.S. Cl. ......................... 345/208; 345/209; 345/100; 327/387
[58] Field of Search ..................................... 327/486, 488, 327/387, 384, 298, 170, 73, 108; 345/209, 208

[56] References Cited

U.S. PATENT DOCUMENTS

| | | | |
|---|---|---|---|
| 4,504,744 | 3/1985 | Balakrishnan et al. | 307/456 |
| 5,081,400 | 1/1992 | Weber et al. | 315/169.4 |
| 5,378,941 | 1/1995 | Nishio et al. | 326/110 |
| 5,430,335 | 7/1995 | Tanoi et al. | 327/170 |
| 5,523,713 | 6/1996 | Yukutake et al. | 327/411 |
| 5,801,565 | 9/1998 | Kuo | 327/202 |

OTHER PUBLICATIONS

Interface Circuit Data Book 1987 by Texas Instrument pp. 3–135.

*Primary Examiner*—Steven J. Saras
*Assistant Examiner*—John G. Lim
*Attorney, Agent, or Firm*—Anotnelli, Terry, Stout & Kraus, LLP

[57] ABSTRACT

A driver circuit wherein a first switching element and a second switching element are totem-pole-connected, wherein the totem pole connection is connected at its one end, node and other end with a power source, an output to a load and a reference potential, respectively, wherein the first switching element is connected between the one end and the node, wherein the second switching element is connected between the node and the other end, and wherein a third switching element is connected between the one end of the totem pole connection and the control terminal of the first switching element.

9 Claims, 18 Drawing Sheets

DRIVER CIRCUIT, DRIVER INTEGRATED CIRCUIT, AND DISPLAY DEVICE AND ELECTRONIC DEVICE USING THE DRIVER CIRCUIT AND DRIVER INTEGRATED CIRCUIT

BACKGROUND OF THE INVENTION

The present invention relates to a driver circuit for driving a variety of loads, such as capacitive loads or inductive loads, and a driver integrated circuit (hereinafter referred to as the "driver IC") having the driver circuit therein. The present invention further relates to a display device and an electronic device driven by the driver circuit and the driver IC.

In recent years, semiconductor integrated circuits or driver ICs have been developed in which there is packaged either a circuit for driving a capacitive load, such as a flat display, e.g., a gas discharge display panel (or plasma display panel) or an electroluminescence display panel (or EL display panel), or a circuit for driving an inductive load, such as an electric motor. Since in these driver circuits a relatively high voltage of 100 V to several hundreds of volts are handled, the power consumption of the driver circuit has to be reduced so that it may be integrated in a semiconductor chip.

First, a conventional example of an output driver circuit section in the driver circuit will be described.

In order to effect a display on a flat display panel, there has been used in the prior art a driver circuit, as shown in FIG. 1 of Japanese Patent Laid-Open No. 15327/1984. When a lower bipolar transistor in the circuit is turned on, a load current flows in and through a diode which is provided in the forward direction between the base terminal and emitter terminal of a bipolar transistor arranged on the upper side. Since the base and emitter of the bipolar transistor are reversely biased, the upper bipolar transistor is turned off. When the lower bipolar transistor is off, on the other hand, the upper bipolar transistor is turned on because the power source is connected through a resistor to the base terminal of the upper bipolar transistor. This circuit makes it possible to drive the display of the panel with a simple circuit construction.

On the other hand, a driver circuit, as shown in FIG. 3 of Japanese Patent Laid-Open No. 15327/1984 or in FIG. 3 of Japanese Patent Laid-Open No. 15328/1984, is designed to improve the shape of the output waveform and to reduce the power consumption. However, this circuit has a construction using more elements than those of the above-described circuit.

According to the prior art, the driver circuit, as shown in FIG. 1 of Japanese Patent Laid-Open No. 15327/1984, is advantageous in that a smaller number of elements are used, but involves a problem in that, during a low output time, namely, while the lower transistor is on, the power consumed by a resistor for driving the base of the upper transistor is high.

This high power consumption raises a critical problem especially in circuits required to operate at a high speed, circuits of multi-channel outputs and circuits in which the on period of the lower transistor is long. Another problem is the difficulty in the mounting of parts monolithically, because of high heat generation.

These problems will be described in more detail below.

The first problem is the increase of the current consumed when the operation of the circuit is speeded up.

For a higher speed of a high output of the circuit, it is necessary to enhance the current carrying ability of a transistor Q1 thereby to shorten the time period taken to change the capacity of the circuit by reducing the resistance of a resistor for driving the base of the transistor Q1. This reduction in the resistance raises a problem involving an increase of the current drawn from a high-voltage power source at the low output time when the lower transistor Q2 is on.

The second problem is that the current consumption is multiplied according to the number of outputs, in the case of a driving operation in which these outputs are simultaneously set low. For driving the scanning lines of a plasma display panel, for example, there is not only the general scanning type drive (hereinafter referred to as the "scanning drive" in which the scanning lines are selectively scanned sequentially one by one from the highest to the lowest ones so that the selected scanning lines are set low while the unselected lines are set high), but also the drive for setting all lines simultaneously high or low. The number of scanning lines is as many as 480 to 1,024, depending upon the resolution of the panel.

Let the case be considered in which the circuit described above is used for driving the scanning lines of a plasma display panel.

Since more than two-channel outputs simultaneously do not become low for the scanning drive period, the current flowing through a base driving resistor for one channel becomes the object, and the current consumption hardly raises a problem for this drive period. During the drive period where all the lines are high, the transistor Q2 (the lower transistor) is off so that little current flows through the transistor Q2. During the period where all the lines are low-driven, on the other hand, the transistor Q2 is turned on so that the base current of the transistor Q1 flows from the high-voltage power source, and a current corresponding to the total number of scanning lines flows in the entirety of the panel.

An example of this problem will be considered for the case of driving 480 scanning lines in the load drive circuit, assuming that the high-voltage power source is 150 V, the current flowing through the resistor when the lower transistor is on is 10 mA for each channel, and the duty when all the outputs are low is 50%, for example. The problem is that the current flowing through the resistor for the all-low period is as high as 10 (mA)×480 (channels)=4.8 (A). Moreover, the power loss is as high as 4.8 (A)×150 (V)×50 (%)=360 (W), raising a major problem in the system, and it is difficult to release the heat when the drive circuit is integrated.

The driver circuit shown in FIG. 3 of Japanese Patent Laid-Open No. 15327/1984 or in FIG. 3 of Japanese Patent Laid-Open No. 15328/1084, can solve the aforementioned problems of the prior art, but requires a construction using many elements. Since this circuit requires multiple channels, for example, as many in a 480 to 1,024 as driver circuit for a flat panel display, the integration of this driver circuit leads to an increase in the semiconductor chip area, raising the cost.

An example of a conventional level shift circuit section in the driver circuit now will be described.

As a level shift circuit for a high-voltage driver, there is a known circuit which is composed of two high breakdown voltage NMOSs and two high breakdown voltage PMOSs, the drains of which are connected with the gates of the other devices. The circuit construction of this driver IC is shown in FIG. 21. This driver IC is provided with level shift circuits 100 and output driver circuits 200, the number of which is equal to the number of outputs of the driver IC (64 or 128 outputs).

As another level shift circuit for the high-voltage driver IC of the prior art, there is a known circuit which uses a constant current source composed of a resistor and an NMOS switch, as shown in FIG. 22.

In the high-voltage driver IC (in which a high-voltage power source HV has a voltage as high as several tens V or more, for example) of FIG. 21, the voltage of the high-voltage power source HV is applied as it is between the gates and sources of level shifting PMOSs P1 and P2 and a PMOS P3 of the output driver section. This makes it necessary for the gate oxide films of the PMOSs P1 to P3 to be sufficiently thick for preventing current leakage and dielectric breakdown even when the voltage of the high-voltage power from source HV is applied. This necessity complicates the channel structure, making it difficult to produce the MOS transistors. When the high-voltage power source HV has a voltage of 150 V or higher, moreover, the gate oxide film thickness has to be no less than 0.6 microns from the point of view of reliability, and this thickness is equal to or more than that of the LOCOS (Local Oxidation of Silicon) oxide film, thus raising a problem that the elements are hard to separate.

In the arrangement of FIG. 22, the voltage of the high-voltage power source HV is not applied between the gates and sources of the MOS transistors. When the output voltage is high, however, an NMOS switch N1 in series with a resistor R1 is on so that a through current flows from the high-voltage power source HV to a low-voltage power source VSS through the resistor R1 and the NMOS switch N1. This through current increases when all the outputs are at the high level, and the resistance has to be raised to prevent the flow of the through current. However, an excessively high resistance raises a problem that the operating speed of the level shift circuit is lowered and the layout area is increased.

An object of the present invention is to reduce the power consumption and the current consumption of a driver circuit and a driver IC.

SUMMARY OF THE INVENTION

One feature of the present invention will be described with reference to FIG. 1. In this description, the insulated gate bipolar transistor will be referred to as a "IGBT".

PMOS transistors are connected between the gate terminals and the collector terminals of the upper transistors QT1 to QTn of the IGBTs QT1 to QTn and QB1 to QBn, which are totem-pole-connected, and their gate terminals are controlled by a common drive circuit.

During the scanning drive, a constant current is established by applying a constant voltage to the gate electrodes of the PMOS transistors, thereby to restrict the current to flow into the lower IGBTs Q1 to Qn. During the driving period, while all outputs Q1 to Qn are low, the current flowing into the lower IGBTs Q1 to Qn can be cut by making the gate electrodes of the PMOSs lower than the threshold voltage.

When a plurality of circuits are integrated, the circuit for driving the gate electrodes of the PMOSs can be shared, and the gate driving elements (e.g., resistors) of the prior art are merely replaced by the PMOSS, so that no substantial increase occurs in the circuit. The gate charging currents of the upper IGBTs can be controlled by changing the gate electrodes of the PMOSs. This produces an effect of controlling the time period for the rise during the on period of the upper IGBTs, i.e., for the rise of the high outputs.

The means described above is effective in remarkably reducing the current consumed for the all-low period in the case of multiple channels. The constant current drive brings about an effect that the current consumed is independent of the supply voltage.

The switching elements which are totem-pole-connected, and the switching elements connected between the control terminals of the upper elements of the totem pole connection and one main terminal should not be limited to IGBTs or PMOSs, but can be exemplified by various switching elements, such as bipolar transistors or MOSFETs.

According to another feature of the present invention, there is provided a driver IC including a level shift circuit for changing a low-voltage signal to a high-voltage signal, and a driver circuit driven by the output of the level shift circuit. The driver IC comprises means for suppressing the gate-source voltage of a PMOS, provided on the high-voltage power source side of the level shift circuit, at a sufficiently lower level than that of the high-voltage power source and for blocking a through current, which otherwise would flow from the high-voltage power source to the low-voltage power source.

According to another feature of the present invention, the level shift circuit includes first and second MOS transistors provided on the power source side and connected at their gates with the drains of the other devices, and first and second clamping MOS transistors are connected in series and provided on the side opposed to the power side of the first and second MOS transistors in such a way that the first and second clamping MOS transistors are turned off when the difference between the gate voltage of the second and first MOS transistors not in series with the clamping MOS transistors and their own gate voltage becomes a predetermined or lower voltage. The output of the level shift circuit is extracted from the gate of the first MOS transistor.

According to still another feature of the present invention, a level shift circuit includes first and second MOS transistors having one conductivity type channel; third and fourth MOS transistors having the other conductivity type channel; and first and second switch means. The first MOS transistor, the first switch means and the third MOS transistor are connected in series. The second MOS transistor, the second switch means and the fourth MOS transistor are connected in series. The gate of the first MOS transistor is connected with the common node of the second MOS transistor and the second switch means. The gate of the second MOS transistor is connected with the common node of the first MOS transistor and the first switch means. Terminals of the first and second MOS transistors, other than the gates and those having no common node shared by the first and second switch means, are connected with a high-voltage power source. Terminals of the third and fourth MOS transistors, other than the gates and those having no common node shared by the first and second switch means, are connected with a first low-voltage power source. Terminals of the first and second switch means, having no common node shared by any of the first, second, third and fourth MOS transistors, are connected with a reference voltage power source. The voltage of the reference voltage power source is lower by a predetermined level than the high-voltage power source. The gates of the third and fourth MOS transistors are individually connected with the outputs of a logic circuit using the second low-voltage power source as a power source, so that the third and fourth MOS transistors operate complementarily to each other. The gate of the first or second MOS transistor is used as the output terminal of the level shift circuit to drive a transistor at the next stage with the output signal of the level shift circuit.

According to the present invention, when the gate voltage of the first (or second) PMOS transistor, i.e., the drain voltage of the second (or first) PMOS transistor is lowered to the voltage of the low-voltage power source VSS, the second (first) clamping PMOS transistor, connected in series with the second (first) PMOS transistor, is turned off, if the voltage lowers to a predetermined level, which is slightly (by about 5 V to 20 V) lower than the level of the high-voltage power source HV.

The reason for this is as follows. Since the gate voltages of the first and second clamping PMOS transistors are set lower by a predetermined level (about 5 V to 20 V) than the voltage of the high-voltage power source HV, the gate-source voltage of the second (first) clamping PMOS transistor becomes lower than the threshold voltage (about 1 to 2 V) when the drain voltage of the second (first) PMOS transistor, i.e., the source voltage of the second (first) clamping PMOS transistor becomes lower by the predetermined voltage than the voltage of the high-voltage power source HV.

As a result, the gate-source voltages of the first (second) PMOS transistor and the second (first) clamping PMOS transistor will not exceed the predetermined voltage (about 5 V to 20 V). Moreover, the second (first) clamping PMOS is turned off, so that the through current does not flow.

Still moreover, the gate voltage of the first or second PMOS transistor drives the output driver circuit of the next stage, so that the gate-source voltage of the PMOS transistor used in the output driver circuit does not exceed the predetermined voltage value.

The features of the present invention will become more apparent from the description to be made hereinafter.

DESCRIPTION OF THE PREFERRED EMBODIMENTS (Embodiment 1)

Figure 1:
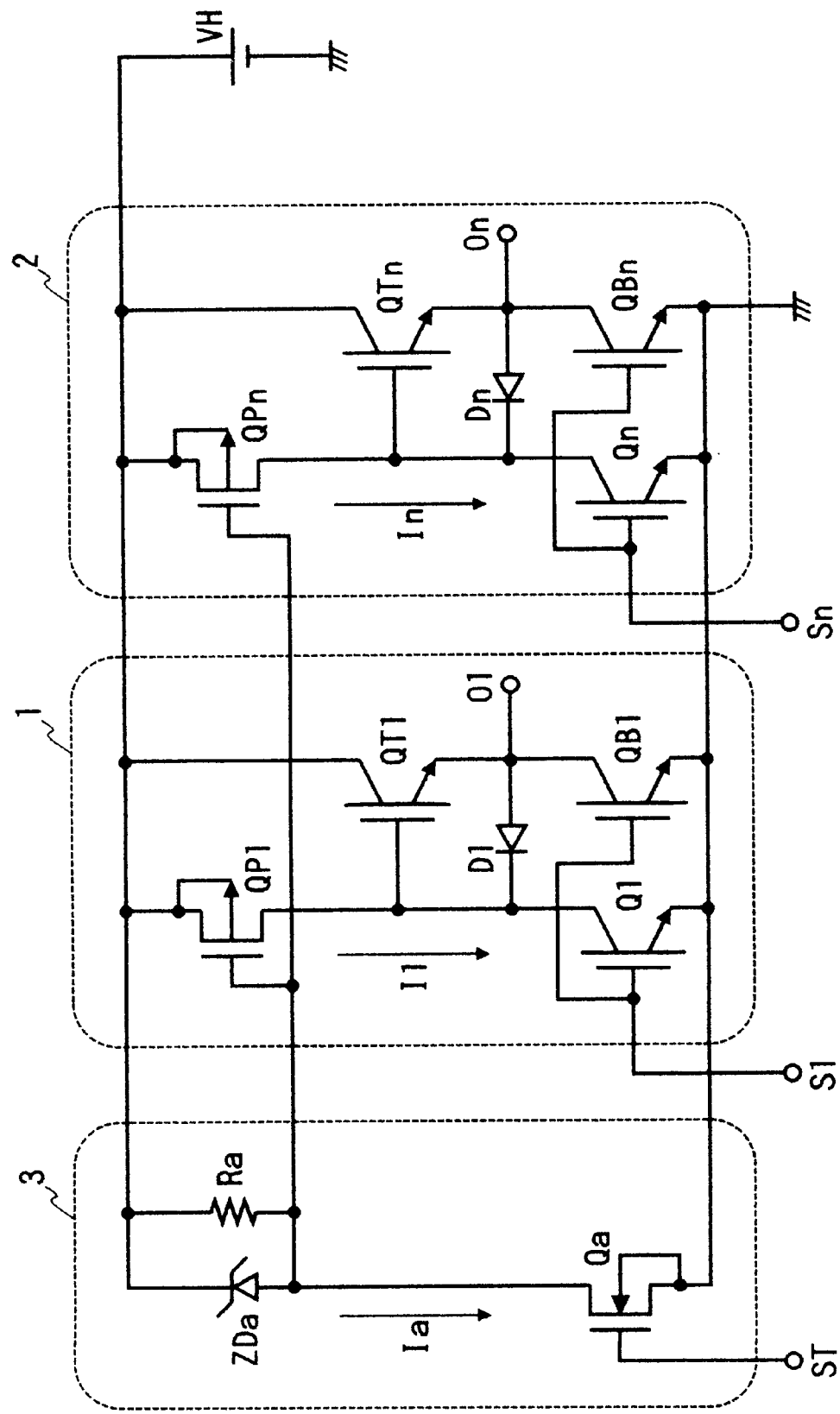
FIG. 1 is a schematic circuit diagram showing a first embodiment of a drive circuit of the present invention.

In FIG. 1, an output circuit 1 for one channel is constructed to include an IGBT QT1 connected at its collector with a high-voltage power source VH and at its emitter with an output terminal O1 and the collector of an IGBT QB1; the IGBT QB1 connected at its emitter with a voltage GND; a diode D1 connected at its cathode with the output terminal O1 and its anode with the gate of an IGBT QT1, the drain of a PMOS QP1 and the collector of an IGBT Q1; the PMOS QP1 connected at its source with the high-voltage power source VH; and the IGBT Q1 connected at its emitter with the GND. The diode D1 may be a Zener diode for protecting the gate of the IGBT QT1. The voltage GND should not be limited to earth potential but may be a constant reference potential.

An output circuit 2 has the construction of an n-th (n=2, 3, . . . ) output circuit, the internal configuration of which is absolutely identical to that of the output circuit 1 so that the description of such output circuits will be omitted. A level shift circuit 3 is constructed to include a Zener diode ZDa connected at its cathode with the high-voltage power source VH and at its anode with the drain of an NMOS Qa; a resistor Ra connected at its one end with the high-voltage power source VH and its other end with the anode of the Zener diode ZDa; and the NMOS Qa connected at its source with the GND. This level shift circuit 3 represents means for transmitting an on/off control signal to the gates of the PMOSs in the output circuits 1 and 2 and may be given another circuit construction.

The anode of the Zener diode ZDa is connected with the gates of the PMOSs QP1 and QPn (n=2, 3, . . . ) in the output circuits. The gates of the IGBTs Q1 and QB1 are connected to receive a common control signal S1. Like the output circuit 1, the output circuit 2 is also connected to receive a control signal Sn (n=2, 3, . . . ).

The gate of the NMOS of the level shift circuit 3 is connected to receive a control signal ST.

Figure 2:
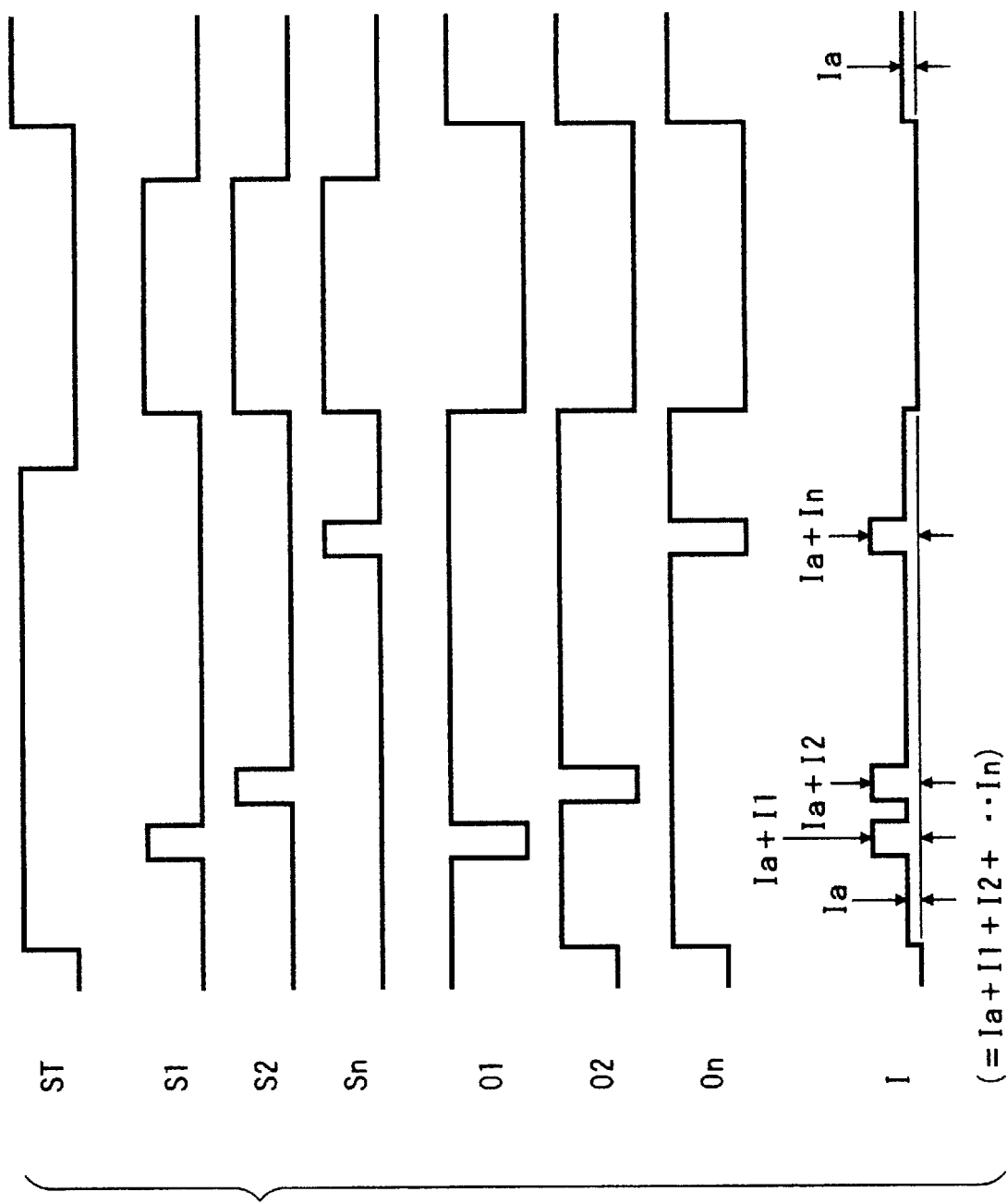
FIG. 2 is a waveform diagram illustrating a control and drive method of the first embodiment.

The control and drive method of this circuit is illustrated in FIG. 2.

The waveforms, as illustrated in FIG. 2, are the control signal waveforms S1, S2 and Sn of the first, second and n-th output circuits, the output waveforms O1, O2 and On, the control signal ST of the level shift circuit 3, and a supply current I.

Now, the operations of the circuits of FIG. 1. In order to set the outputs O1 and O2 high, a gate voltage is applied to the gates of the IGBTs QT1 and QTn through the drains of the PMOSs QP1 and QPn to turn on the upper IGBTs QT1 and QTn and to turn off the lower IGBTs. For this operation, the control signal ST of the level shift circuit 3 is set high, whereas the gate signals S1 and Sn of the lower IGBTs QB1, Q1, QBn and Qn are set low, so that the gate drive PMOSs QP1 and QPn may be turned on.

In order to set the outputs O1 and On low, the upper IGBTs QT1 and QTn are turned off, whereas the lower IGBTs QB1, Q1, QBn and Qn are turned on. The operation can be realized by setting the gate signals S1 and Sn of the lower IGBTs QB1, Q1, QBn and Qn high. When the control signal ST of the level shift circuit 3 is high at this time, gate currents I1 and In flow from the high-voltage power source VH through the PMOSs QP1 and QPn in synchronism with the high levels of the gate signals S1 and Sn. When the signal ST is low, the gate current does not flow because the PMOS QP1 and the PMOS QPn are off. The controls and operations to achieve on/off control of the outputs O1 and On have been described above, and a low-consumption drive can be easily realized for a panel drive by a combination of them, as will be described in the following.

During scanning drive, illustrated by the drive waveforms of FIG. 2, the control signal ST of the level shift circuit 3 is set high, and the pulse signals are sequentially inputted to the lower IGBT drive signals S1, S2, . . . Sn, so that the low outputs O1, O2, . . . On can be sequentially outputted. When the signal S1 is high, for example, the gate current I1 flows from the high-voltage power source VH through the PMOS QP1 into the IGBT Q1. Because of the scan drive, that is, because only one output is low at the same time, another channel gate current does not simultaneously flow. As a result, the currents flowing in the driver circuit are the aforementioned gate current and a current Ia of the level shift circuit 3.

Prior to the scanning drive, the current Ia is set to the lowest level for applying the gate voltages of the PMOSs QP1 and QPn so that the current to be consumed in the driver circuit can be suppressed.

Now, a driving in which all the outputs are set low (all-low driving) will be described. Before the control signals fed to the terminals S1 to Sn are set high, the terminal ST is set low to turn off the NMOS Qa, so that the gate voltages of the PMOSs QP1 to QPn are lowered by the resistor Ra to the same potential as that of the source, i.e., lower than the threshold voltage to turn off the PMOSs QP1 to QPn. When the high signal is then inputted from the terminal S1 to the terminal Sn, the upper IGBTs QT1 to QTn are turned off, whereas the lower IGBTs QT1 to QTn are turned on so that all the outputs can be set low (all-low). During the all-low driving, therefore, no current flows through the driver circuit.

In the case of the driving in which all the outputs are set high (i.e., "all-high"), during the scanning drive, the signals S1 to Sn are low, but what flows in the driver circuit is the current Ia of the level shift circuit 3. By the circuit construction and drive described above, therefore, for the scan drive, all-high drive and all low drive periods, a low consumption can be realized, and so the circuit can be optimally applied to the scanning line driver circuit for the capacitive panel represented by the plasma display panel requiring multi-channel drive.

(Embodiment 2)

Figure 3:
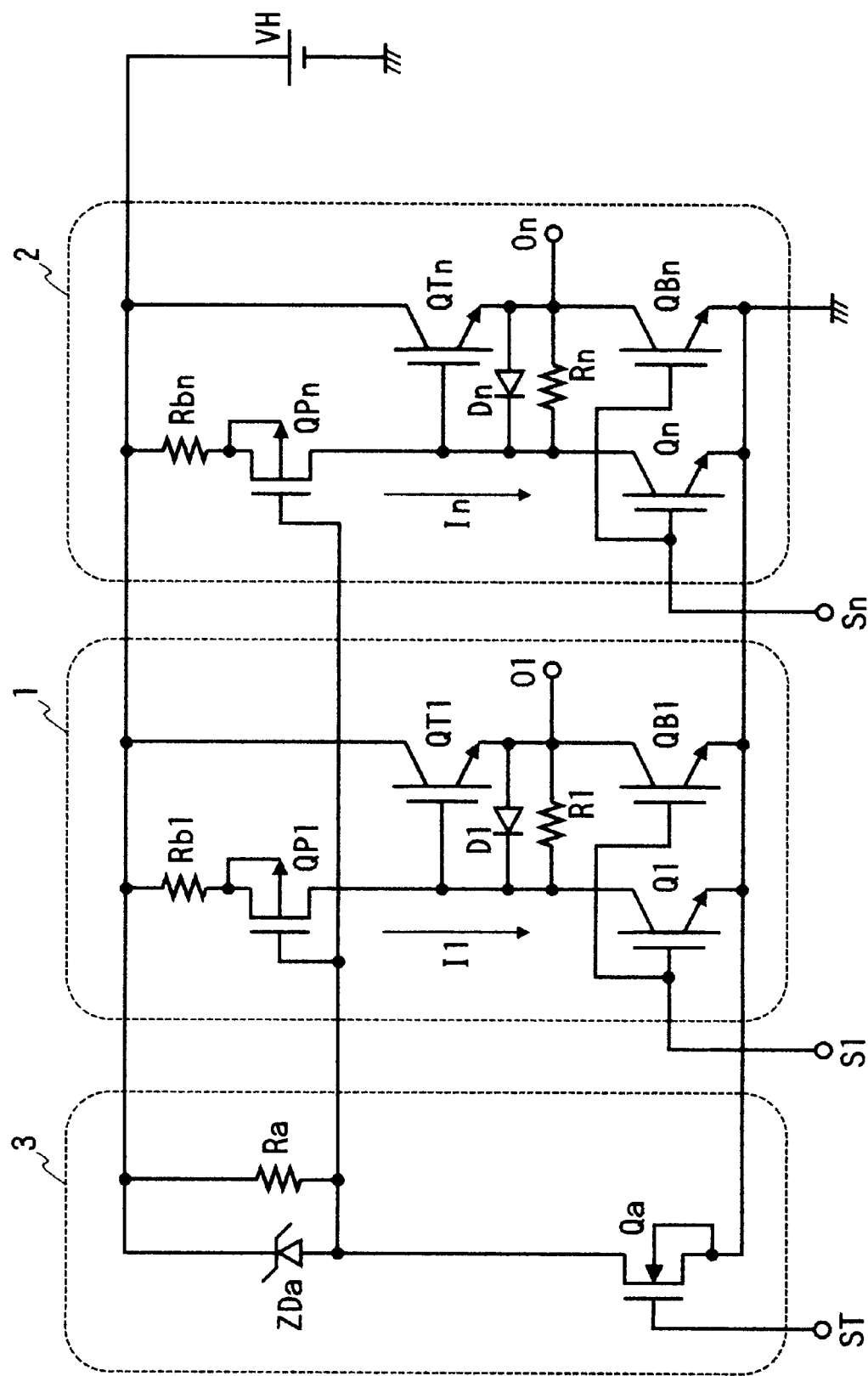
FIG. 3 is a schematic circuit diagram showing a second embodiment of the drive circuit of the present invention.

In FIG. 3, resistors RB1 and RBn are connected between the sources of PMOSs QP1 and QPn and the high-voltage power source VH of FIG. 1, and resistors are also connected between the gates and emitters of the IGBTs QT1 and QTn.

The resistors R1 and Rn short the gates and sources of the upper IGBTs QT1 and QTn with no error when the PMOSs QP1 and QPn are off and when the lower IGBTs Q1, QB1, Qn and QBn are off to turn off the upper IGBTs QT1 and Qtn. As a result, there is produced an effect of realizing the function of giving the outputs O1 and On a high impedance.

The resistors RB1 and RBn serve to limit the currents of the PMOSs QP1 and QPn. Even when the voltage generated by the level shift circuit 3 shown in FIG. 3 is uniquely determined by the Zener diode ZDa, the gate voltages of the PMOSs QP1 and QPn can have a degree of freedom by connecting the resistors RB1 and RBn, providing an optimum setting for the gate electrodes I1 and In.

(Embodiment 3)

Figure 4:
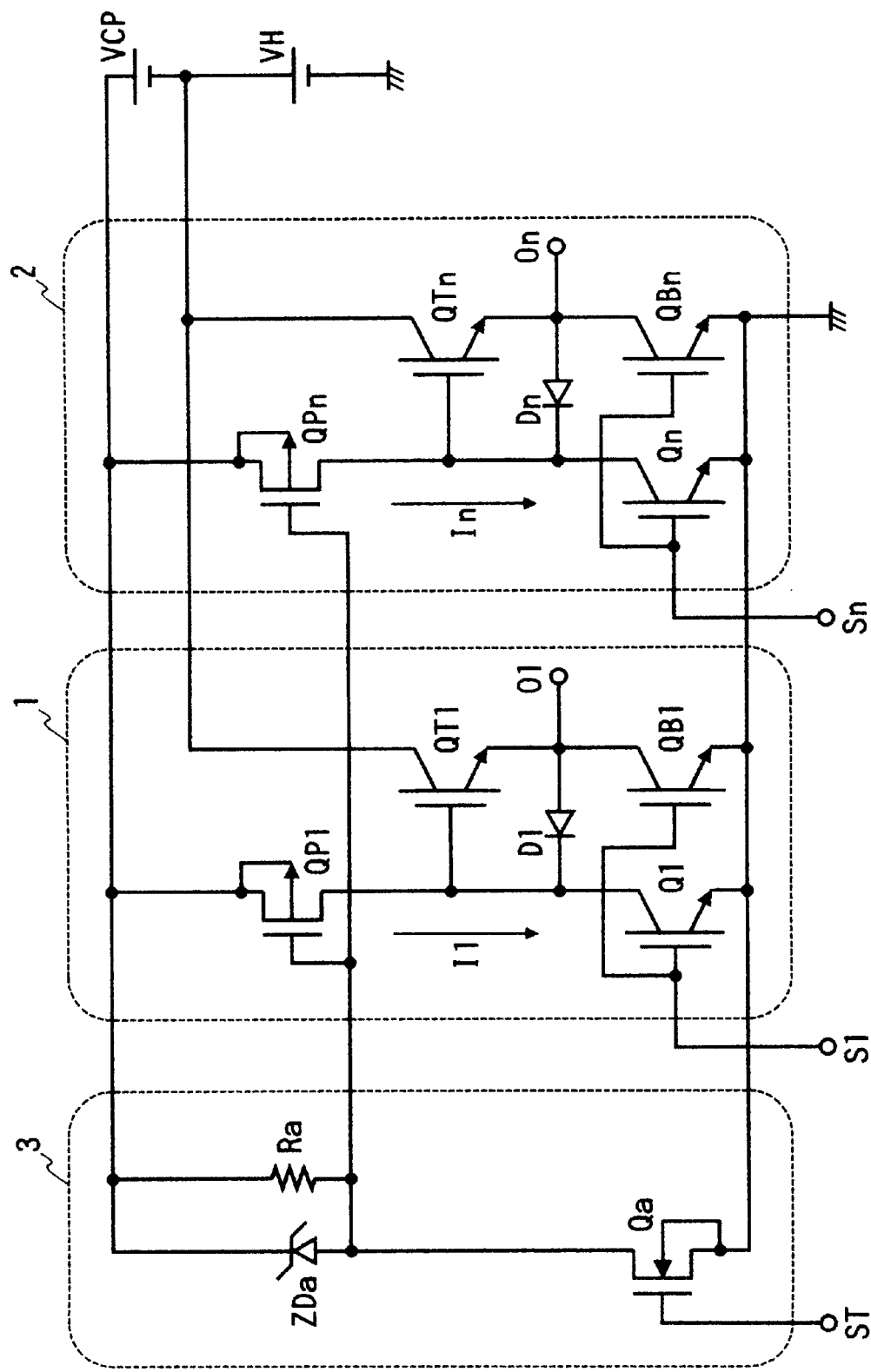
FIG. 4 is a schematic circuit diagram showing a third embodiment of the drive circuit of the present invention.

In FIG. 4, the circuit of FIG. 1 is improved with respect to the rising characteristics of the outputs O1 and On by connecting a floating power supply VCP between the sources of the PMOSs QP1 and QPn and the high-voltage power source.

The circuit of FIG. 1 is characterized in that the potentials of the outputs O1 and On are blunt in the vicinity of VH when they rise from low to high levels. This is because the voltage difference between the emitters and gates of the upper IGBTs QT1 and QTn become smaller as the outputs O1 and On become closer to the voltage VH. The characteristics can be easily solved, if necessary, by using the floating power source VCP, as shown in FIG. 4.

(Embodiment 4)

Figure 5:
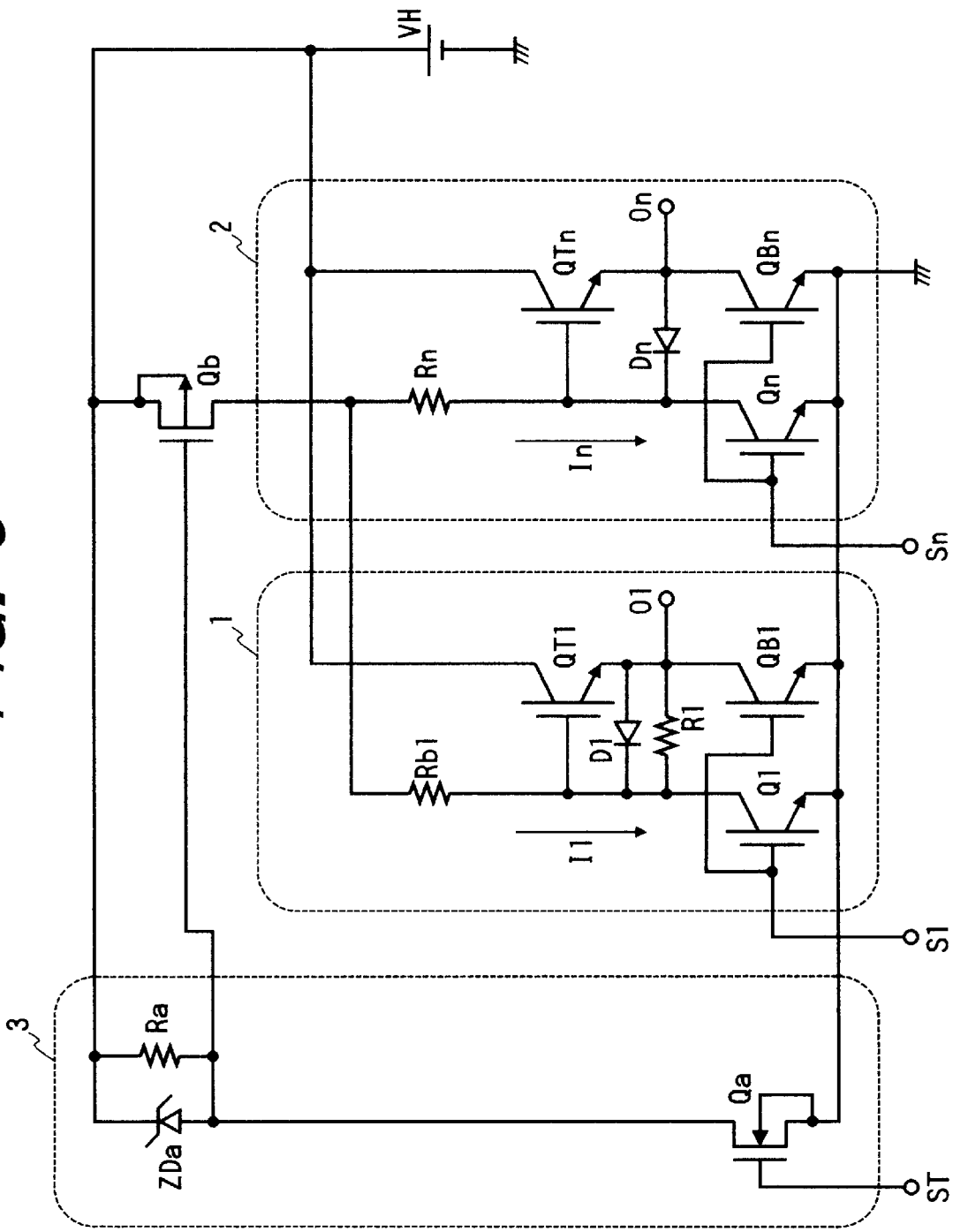
FIG. 5 is a schematic circuit diagram showing a fourth embodiment of the drive circuit of the present invention.

The circuit of FIG. 5 is simplified with respect to FIG. 1 by the fact that it was one PMOS switch. This single PMOS Qb is connected at its source with the high-voltage power source VH, at its drain with the resistors R1 and Rn and at its gate with the level shift circuit 3. For the all-low drive, the gate currents I1 and In can be reduced to zero by turning off the PMOS Qb, so that a low-consumption drive can be achieved as in the circuit of FIG. 1.

(Embodiment 5)

Figure 6:
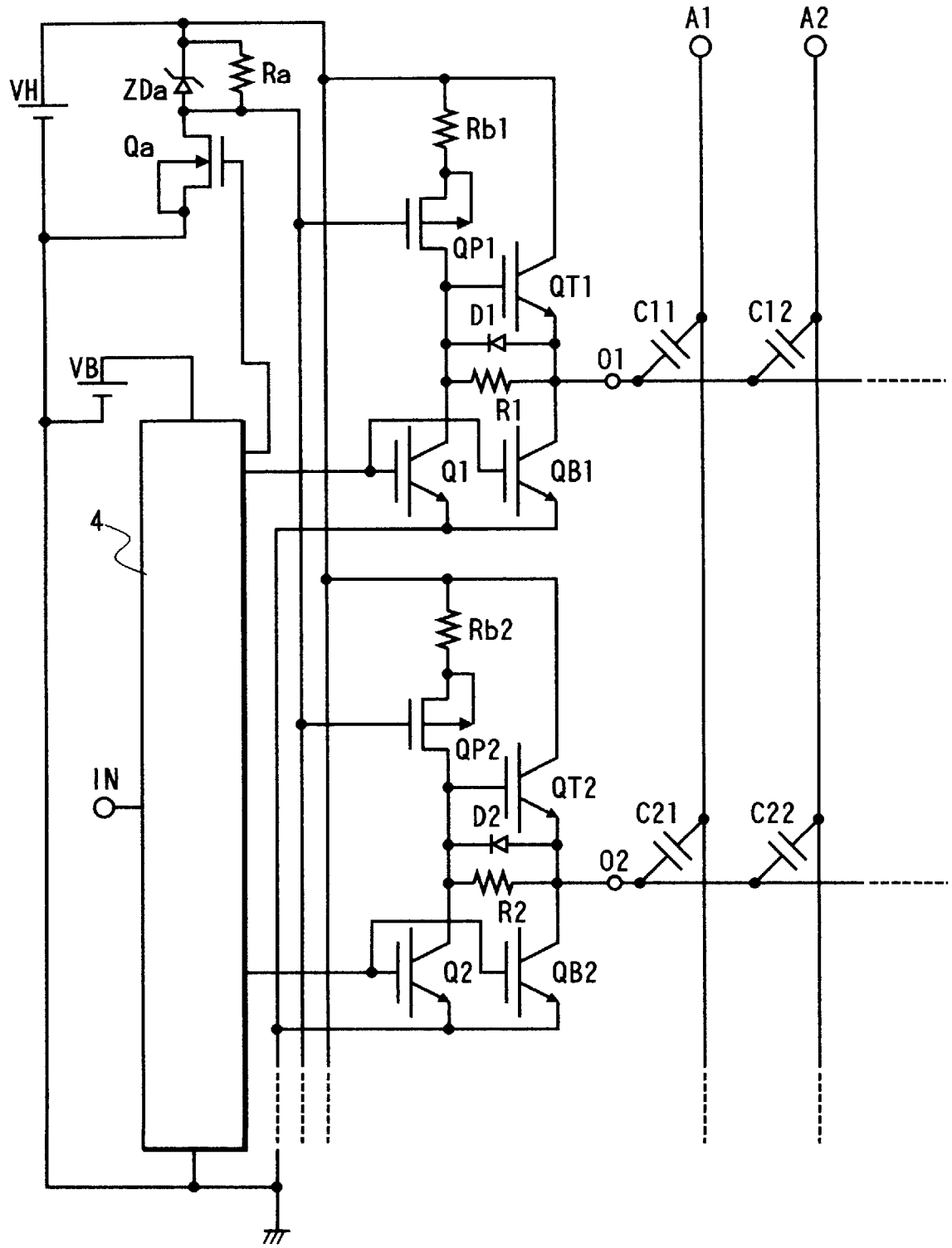
FIG. 6 is a schematic circuit diagram showing a display device of a plasma display panel using the drive circuit shown in FIG. 3.

FIG. 6 shows an embodiment in which the driver circuit of FIG. 3 is applied to the drive of the scanning side electrodes of the plasma display panel. This application should not be limited to the driver circuit of FIG. 3, but any of the driver circuits of the other embodiments can be applied thereto.

By using power terminals 10 and 12 as the common terminals, as shown in FIG. 6, the output section of the circuit shown in FIG. 3 is provided for multiple channels, the output terminals O1, O2, . . . of each channel are individually connected with the scanning side electrodes of the plasma display panel. Reference symbols A1, A2, . . . designate data side electrodes. At the intersections with the scanning side electrodes, the display pixels C11, C12, . . . C21 and C22 of the plasma display panel are provided. These display pixels are capacitive loads.

By way of example, it is assumed that a power terminal 11 is a power source for a control logic 4 and kept at a potential of 5 (V) with respect to the power terminal 12, and the power terminal 10 is a power source necessary for driving the scanning side and is kept at a potential of 100 to 200 (V) with respect to the power terminal 12.

When data are written in the plasma display panel, the scanning side outputs are sequentially set low, and the voltages are applied to the data side electrodes in accordance with a display pattern. For example, when the data are written on the line of the scanning side O1, the line on which data are written is selected by setting the output O1 low from the scanning side output circuit and the other outputs high, and the high or low voltage is applied to the data side electrodes A1, A2, . . . in accordance with the display pattern. Then, the data are written in the display pixels C11, C12, . . . . By performing these drives for all the scanning lines of the panel, the display data are written in all the pixels of the panel.

To drive the plasma display panel, not only the scanning drive, but also the all-low or all-high drive of the scanning lines, is required. Especially for the all-low drive of the scanning lines, the current consumed for this period can be reduced to zero, as described with reference to FIG. 3, by turning on the PMOSs Qp1, Qp2, . . . and turning off the lower IGBTs Q1, QB1, Q2, QB2, . . . of FIG. 6.

(Embodiment 6)

Figure 7:
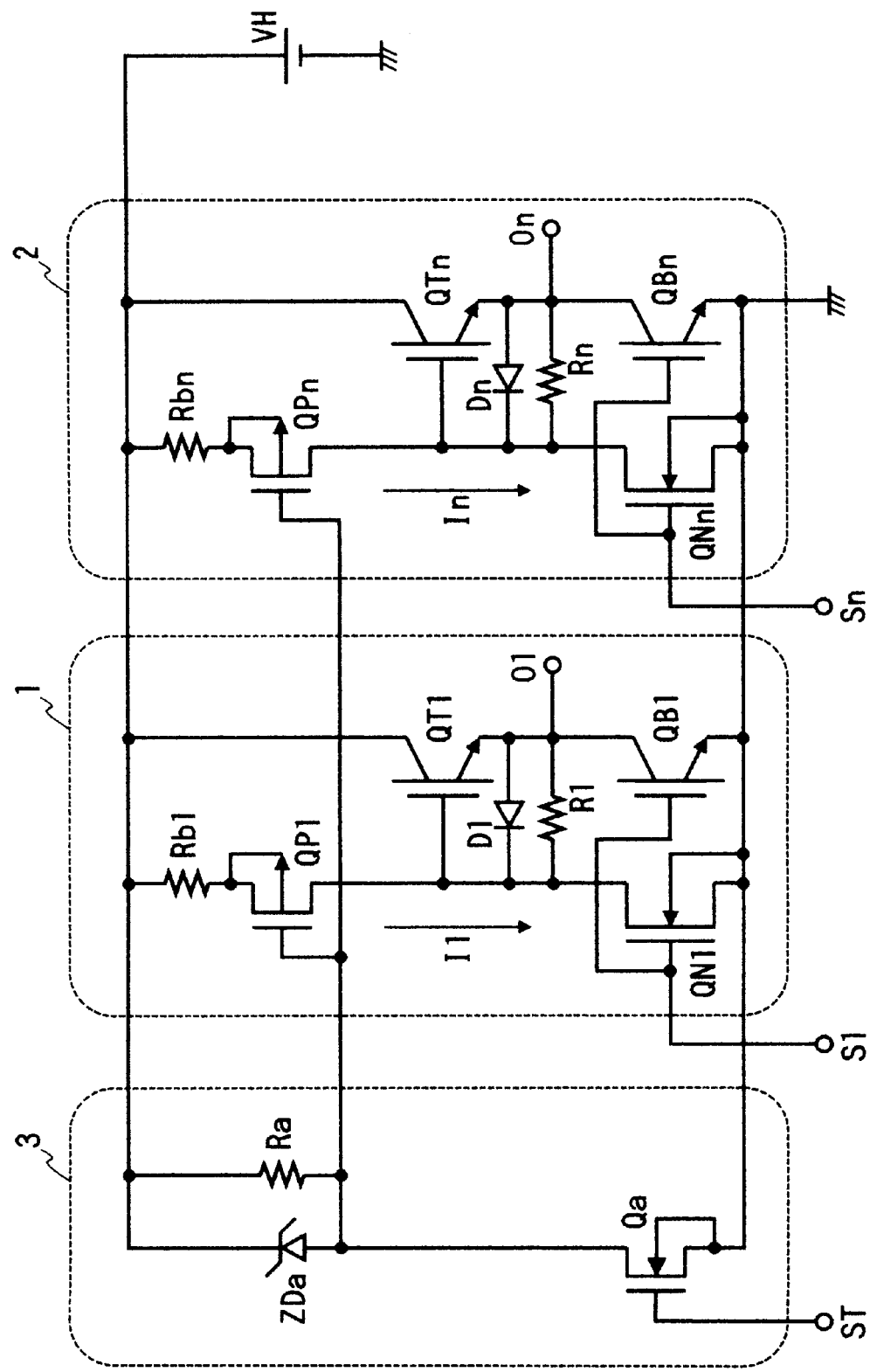
FIG. 7 is a schematic circuit diagram showing a sixth embodiment of the drive circuit of the present invention.

The circuit of FIG. 7 is a modification of the circuit of FIG. 3, that is, the lower IGBTs Q1 and Qn are replaced by NMOSs QN1 and QNn, respectively.

When the influence of the tailing characteristics of the IGBTs Q1 and Qn cannot be ignored relative to the rise delays of the outputs O1 and On of the circuit of FIG. 3, the use of the NMOSs is effective in improving the rising characteristics.

For switching the outputs O1 and On from low to high levels, in the circuit of FIG. 3, the gate signals S1 and Sn of the lower IGBTs Q1, QB1, Qn and QBn are set low to turn off the lower IGBTs Q1, QB1, Qn and QBn, and consequently the gates of the upper IGBTs QT1 and QTn are charged with the gate currents I1 and In, turning on the upper IGBTs QT1 and QTn. Due to the tailing characteristics of the IGBTs, the IGBTs Q1 and Qn are not instantly turned off even if the gate signals S1 and Sn are set low. However, the gate currents partially flow through the IGBTs Q1 and Qn to GND so that the reduction in the gate currents will increase the charging time periods of the upper IGBTs QT1 and QTn. As a result, the rise time periods of the outputs O1 and On are increased. The lifetime control by irradiation with an electron beam is effective in improving the tailing characteristics of the IGBTs, but will sacrifice the excellent current characteristics intrinsic to the IGBTs. Of the lower IGBTs, therefore, the IGBTs Q1 and Qn of the circuit of FIG. 3, which do not directly contribute to the output currents, are replaced by the NMOSs QN1 and QNn, as shown in FIG. 7, so that the rise delay times of the outputs O1 and On can be improved.

(Embodiment 7)

Figure 8:
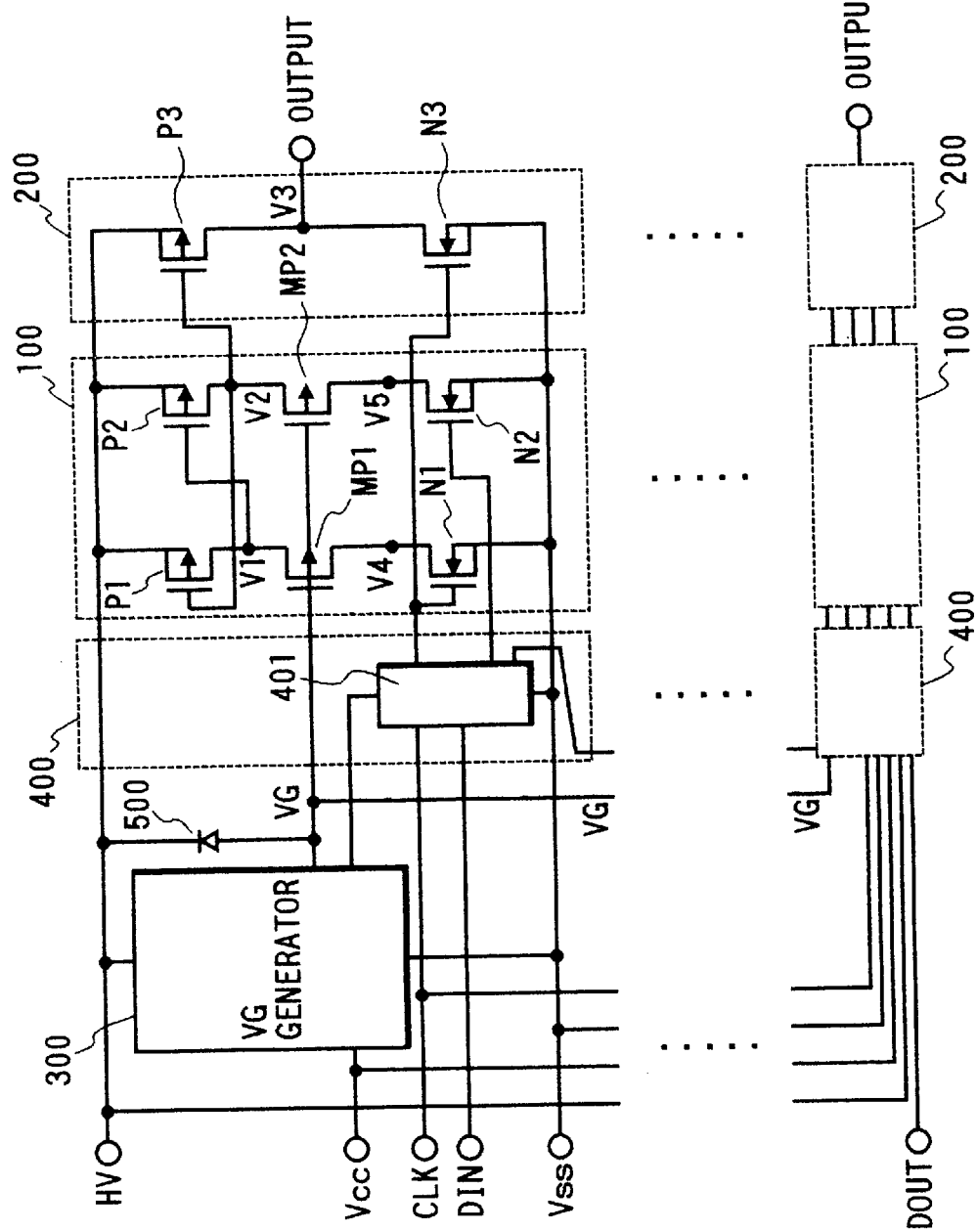
FIG. 8 is a schematic circuit diagram showing the configuration of a level shift and output driver section of a seventh embodiment of the present invention.

In FIG. 8, reference numeral 100 designates a level shift circuit, and numeral 200 denotes an output driver circuit. Symbol HV designates the voltage of a high-voltage power source; symbol VSS denotes the voltage of a first low-voltage power source; and symbol VCC denotes the voltage of a second low-voltage power source. The voltage VSS is at the lowest level, usually at ground potential.

The number of the level shift circuits 100 and the output driver circuits 200 are equal to the number (e.g., 64) of the output bits of the driver IC. Each level shift circuit 100 is composed of four PMOS transistors P1, P2, MP1 and MP2 and two NMOS transistors N1 and N2.

The PMOS transistors P1 and P2 are connected at their sources with the high-voltage power source HV and at their gates with the drains of the other PMOS transistors. The PMOS transistors MP1 and MP2 are connected in series with the transistors P1 and P2, respectively, and at their gates with a reference voltage (VG) generating circuit 300 so that they are fed with the voltage VG which is lower by a predetermined level than the voltage HV of the high-voltage power source.

The N-type MOS transistors N1 and N2 are connected in series with the transistors MP1 and MP2, respectively, and at their sources with the first low-voltage power source VSS, and they are supplied at their gates with the output signal of a shift register 400. To the gate of the transistor N2, there is inputted a signal which is the inverse of the signal inputted to the gate of the transistor N1.

The output driver circuit 200 is composed of a PMOS transistor P3 and an NMOS transistor N3. The transistor P3 is connected at its source with the high-voltage power source HV, at its gate with the drain of the transistor P2 and the gate of the transistor P1, and at its drain with the output terminal. The transistor N3 is connected at its source with the first low-voltage power source VSS, at its gate with the shift register 400 and the gate of the transistor N1, and at its drain with the output terminal. The shift register is supplied with a clock signal CLK and a data signal DIN, the latter being transferred in the shift register 400 for each cycle of the clock signal.

Now, the operation of the present circuit will be described, taking the case when the voltage output is switched from the low level to the high level. At this switching time, the transistor N2 is supplied at its gate with a voltage signal corresponding to the voltage VCC of the second low-voltage power source, whereas the transistors N1 and N3 are supplied at their gates with a voltage signal corresponding to the voltage VSS of the first low-voltage power source by the shift register 400. As a result, the transistors N1 and N3 are turned off, whereas the transistor N2 is turned on.

As an example, it is assumed that HV=160 V, VG=140 V, VCC=5 V, VSS=0 V, and the threshold voltage Vth of the transistor MP2 is –1 V. Since the output voltage is at the low level first, the transistor P3 is off, so that the transistor MP2 has a source voltage V2 at 160 V. As a result, the transistor MP2 is turned on because its gate-source voltage is VG–V2=140–160=–20 V, which exceeds the threshold voltage of –1 V. Hence the transistor N2 conducts, and the source voltage V2 of the transistor MP2 lowers. When this voltage V2 reaches a value of VG–Vth=140–(–1)=141 V, the transistor MP2 is turned off. In accordance with the drop in the voltage V2, the transistor P1 is turned on, so that the transistor P2 is turned off when a voltage V1 comes close to the voltage HV of the high-voltage power source. As a result, the source voltage V2 of the transistor MP2 is kept at 141 V. At this time, both the gate-source voltages of the transistors P1 and P3 can be V2–HV=141–160=–19 V, which is far lower than the voltage HV of the high-voltage power source. Since the transistors P2 and MP2 are off, no through current flows through the transistor N2 from the high-voltage power source to the low-voltage power source.

A similar operation is also achieved at the switching time of the voltage outputs from the high level to the low levels. In this case, the transistor MP1 is turned off and its source voltage V1 is kept at 141 V. As a result, the gate-source voltage of the transistor P2 is –19 V, which is far lower than the voltage HV of the high-voltage power source. Moreover, the transistors P1 and MP1 are off, so that no through current will flow through the transistor N1 from the high-voltage power source to the low-voltage power source.

Since a voltage of about 20 V is applied between the gates and sources of the transistors P1, P2, P3, MP1 and MP2, the gate oxide films of these elements are thicker (about three to four times) than those of the transistors N1, N2 and N3 supplied with 5 V between their gates and sources.

Now, the function of a diode 500 will be described. This diode 500 operates during a load drive time while the voltage VH of the high-voltage power source of the driver IC is lowered for a period. When the voltage HV is lowered from 160 V to 60 V, for example, the VG generating circuit 300 cannot follow the voltage drop, it abrupt, and the voltage HV may drop temporarily to a far lower level than the voltage VG. As a result, the voltage drop may obstruct the high-speed operation of the driver IC. At this time, the diode 500, if present, prevents the voltage HV from becoming lower by about 0.8 V or more than the voltage VG. Thus, the voltage HV can restore a predetermined value (40 V in this embodiment) of the voltage VG within a short time period, even if it is abruptly lowered to 60 V, so that the operation of the driver IC is hardly delayed.

(Embodiment 8)

Figure 9:
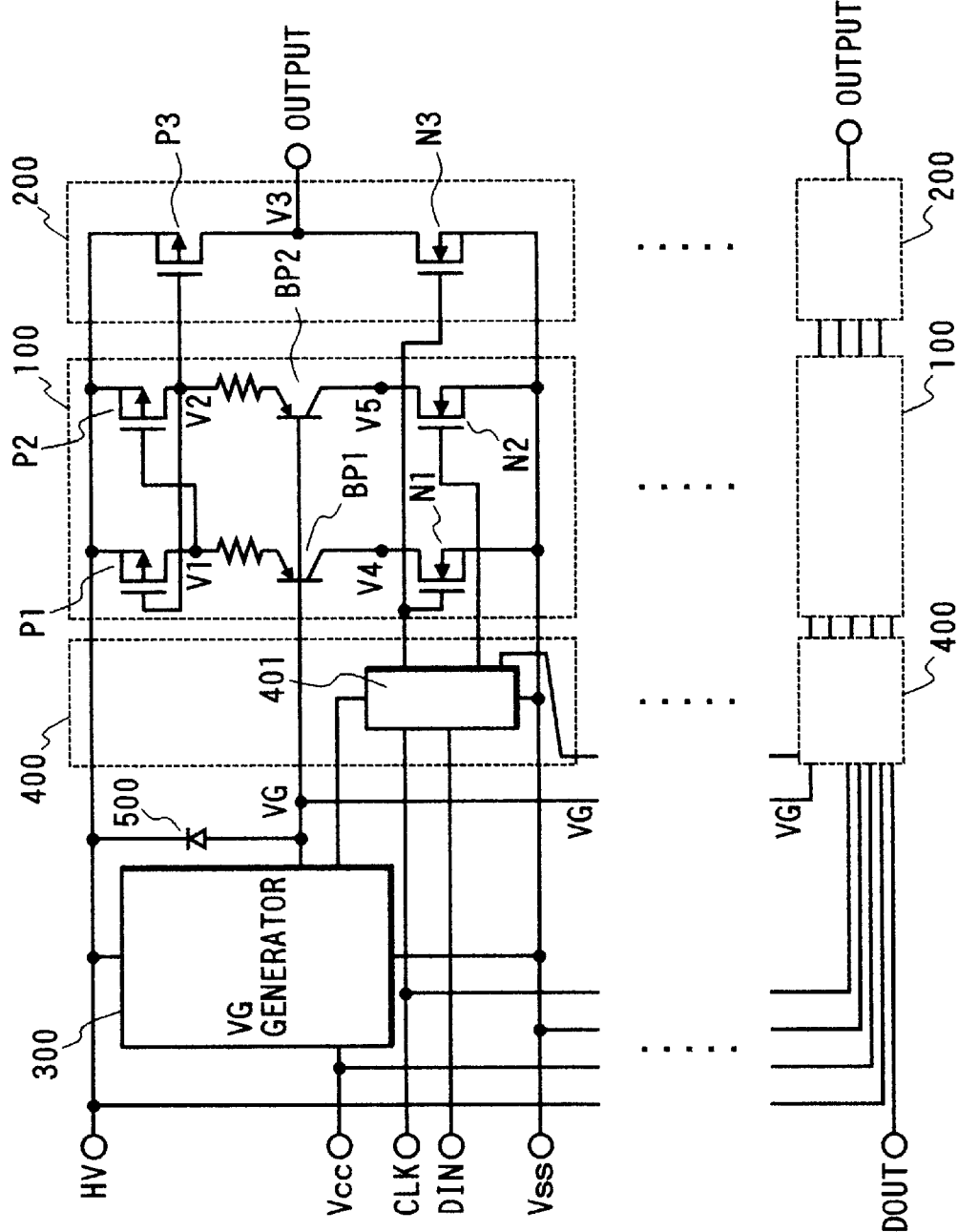
FIG. 9 is a schematic circuit diagram showing the configuration of a level shift and output driver unit of an eighth embodiment of the present invention.

In the circuit of FIG. 9, the clamping MOS transistors MP1 and MP2 of FIG. 8 are replaced by first and second clamping bipolar transistors BP1 and BP2. Both of these transistors BP1 and BP2 are PNP bipolar transistors, the bases of which are connected with the VG generating circuit 300. Moreover, the transistor BP1 is connected at its emitter with the drain of the PMOS transistor P1 and the gate of the PMOS transistor P2 and at its collector with the drain of the NMOS transistor N1. The transistor BP2 is connected at its emitter with the drain of the PMOS transistor P2 and the gate of the PMOS transistor P1 and at its collector with the drain of the NMOS transistor N2.

The operations of the present circuit will be described, taking the case in which the voltage output is switched from low to high levels. At the switching time, the voltage signal corresponding to the voltage VCC of the second low-voltage power source is inputted to the gate of the transistor N2, whereas the voltage signal corresponding to the voltage VSS of the first low-voltage power source is supplied by the shift register 400. As a result, the transistors N1 and N3 are turned off, whereas the transistor N2 is turned on.

As an example, it is assumed that HV=160 V; VG=140 V; VCC=5 V; VSS=0 V; and the base-emitter forward voltage VBE of the transistor BP2 is 0.8 V. Since the output voltage is at the low level first, the transistor P3 is off, so that the transistor BP2 has the emitter voltage V2 of 160 V. As a result, the transistor BP2 is on. As the transistor N2 becomes conductive, the emitter voltage V2 of the transistor BP2 lowers. When this emitter voltage V2 lowers to the level of VG+VBE=140+0.8=140.8 V, the transistor BP2 is turned off. In accordance with the drop of the voltage V2, the transistor P1 is turned on, so that the voltage V1 becomes close to the voltage HV of the high-voltage power source. Then, the transistor P2 is turned off, so that the emitter voltage V2 of the transistor BP2 is kept at 140.8 V. At this time, both of the gate-source voltages of the transistors P1 and P3 are V2−HV=140.8−160=−19.2 V, so that they can be far lower than the voltage HV of the high-voltage power source. Moreover, the transistors P2 and BP2 are off, so that no through current flows through the transistor N2 from the high-voltage power source to the low-voltage power source.

The operations are similar, too, when the output voltage is switched from the high level to the low level. In this case, the transistor MP1 is turned off, so that the emitter voltage V1 of the transistor BP1 is kept at 140.8 V. As a result, the gate-source voltage of the transistor P2 is −19.2 V, so that it can be made sufficiently lower than the voltage HV of the high-voltage power source. Moreover, both the transistors P1 and MP1 are off and hence no through current flows through the transistor N1 from the high-voltage power source to the low-voltage power source.

Here, a voltage of about 20 V is applied between the gates and sources of the transistors P1 and P2, so that their gate oxide films is made thicker (by about three to four times) that those of the transistors N1, N2 and N3, the gates and sources of which are supplied with 5 V.

(Embodiment 9)

Figure 10:
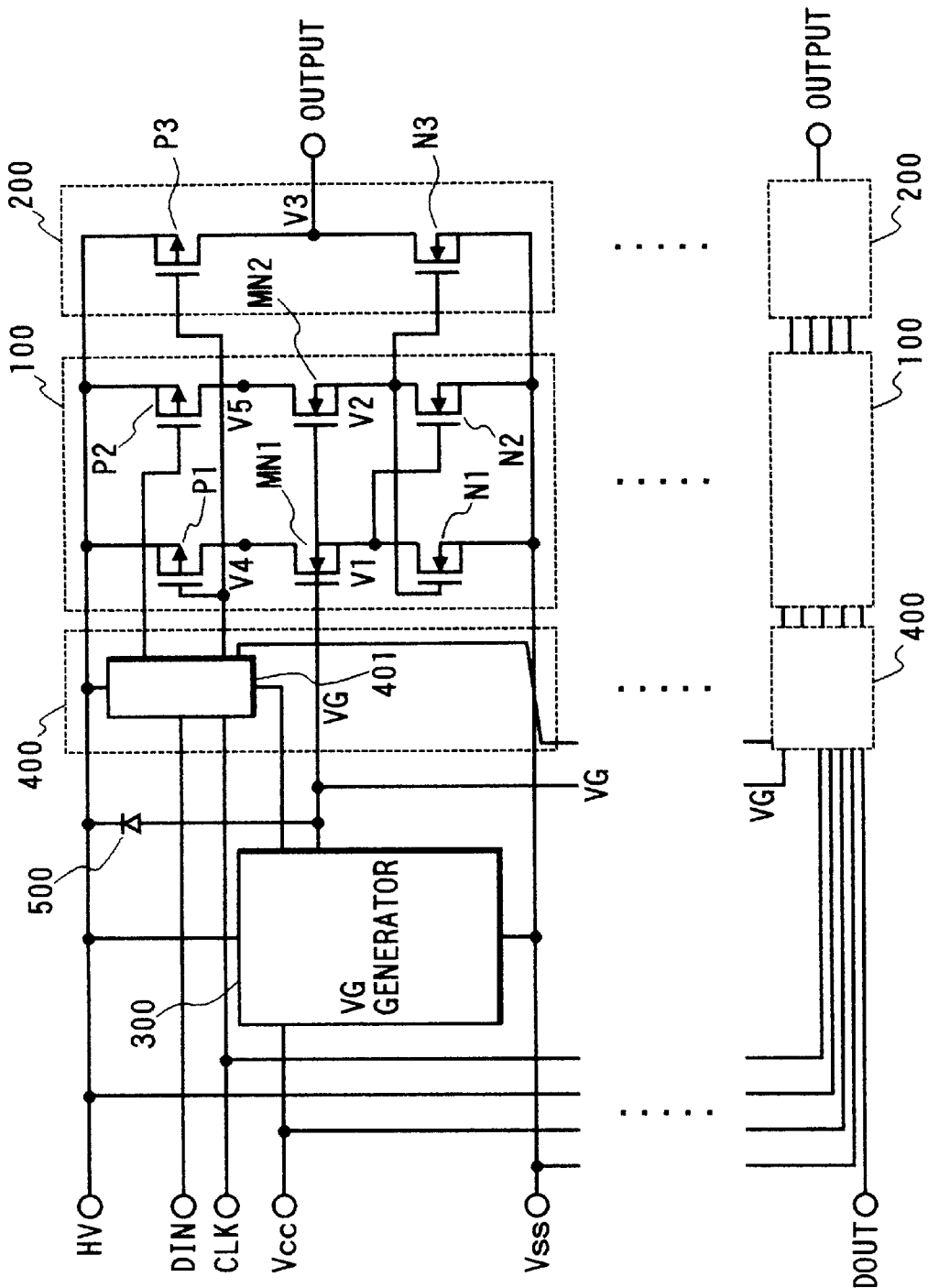
FIG. 10 is a schematic circuit diagram showing the configuration of a level shift and output driver unit of a ninth embodiment of the present invention.

The driver circuit of FIG. 10 is substantially identical in its basic circuit construction to that of the seventh embodiment. The level shift circuit 100 is composed of four NMOS transistors N1, N2, MN1 and MN2 and two PMOS transistors P1 and P2.

The NMOS transistors N1 and N2 are connected at their sources with the first low-voltage power source VSS and at their gates with the drains of the remaining NMOS transistors. The NMOS transistors MN1 and MN2 are connected in series with the transistors N1 and N2, respectively, and are connected at their gates with the reference voltage (VG) generating circuit 300, so that they are supplied with the voltage VG which is higher by a predetermined voltage than the voltage VSS of the first low-voltage power source.

The PMOS transistors P1 and P2 are connected in series with the transistors MN1 and MN2, respectively, and are connected at their sources with the high-voltage power source HV and received at their gates the output signal of the shift register 400. The gate of the transistor P2 is supplied with a signal which is the inverted signal of the signal fed to the gate of the transistor P1.

The output driver circuit 200 is composed of the NMOS transistor N3 and the PMOS transistor P3. The transistor N3 is connected at its source with the first low-voltage power source VSS, at its gate with the drain of the transistor N2 and the gate of the transistor N1, and at its drain with the output terminal. The transistor P3 is connected at its source with the high-voltage power source HV, at its gate with the shift register 400 and the gate of the transistor P1, and at its drain with the output terminal. The shift register 400 is supplied with the clock signal CLK and the data signal DIN, and the latter is transferred in the shift register 400 for each cycle of the clock signal.

The operations of the present circuit will be described, taking the case in which the voltage output is switched from high to low levels. For example, it is assumed that HV=0 V; VG=−140 V; VCC=−5 V; VSS=−160 V; and the threshold voltage Vth of the transistor MN2 is 1 V.

At the switching time, the gate of the transistor P2 receives a voltage signal corresponding to the voltage VCC of the second low-voltage power source, whereas the gates of the transistors P1 and P3 are supplied with a voltage signal corresponding to the voltage VH of the high-voltage power source by the shift register 400. As a result, the transistors P1 and P3 are turned off, and the transistor P2 is turned on.

Since the output voltage is at the high level first, the transistor N3 is off, so that the voltage of the source of the transistor MN2 is −160 V. As a result, the gate-source voltage of the transistor MN2 is VG−V2=−140−(−160)=20 V and is higher than the threshold voltage Vth of 1 V, so that the transistor MN2 is on. As the transistor P2 becomes conductive, the source voltage V2 of the transistor MN2 rises. When this source voltage V2 rises to VG−Vth=−140−1=−141 V, the transistor MN2 is turned off. The transistor N1 is turned on by the rise in the voltage V2, and the transistor N2 is turned off as the voltage V1 becomes close to the voltage VSS of the first low-voltage power source, so that the source voltage V2 of the transistor MN2 is kept at 141 V. At this time, both the gate-source voltages of the transistors N1 and N3 are V2−HV=141−(−160)=19 V, which is far lower than the absolute value of 160 V of the supply voltage. Moreover, the transistors N2 and MN2 are off, so that no through current flows through the transistor P2 from the high-voltage power source to the low-voltage power source. These operations are similar to those of the case in which the output voltage is switched from the low level to the high level.

Here, a voltage of about 20 V is applied between the gates and sources of the transistors N1, N2, N3, MN1 and MN2, so that their gate oxide films are thicker (by about three to four times) than those of the transistors P1, P2 and P3, the gates and sources of which are fed with 5 V.

Figure 11:
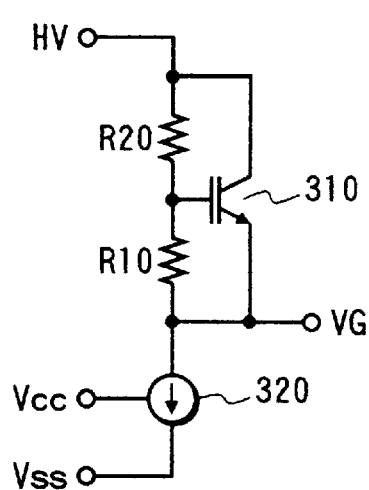
FIG. 11 is a schematic circuit diagram of one embodiment of a reference voltage generating means used in a driver IC of the present invention.
Figure 12:
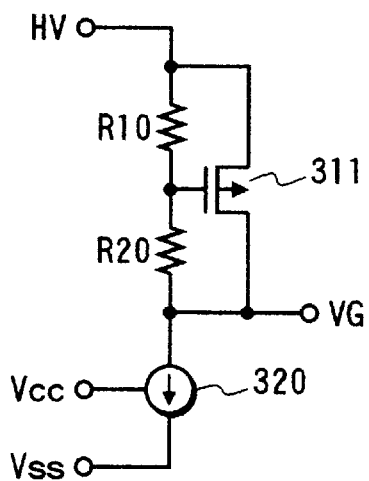
FIG. 12 is a schematic circuit diagram showing another embodiment of a reference voltage generating means used in a driver IC of the present invention.
Figure 13:
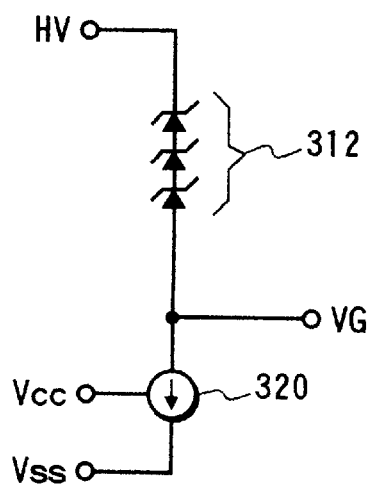
FIG. 13 is a schematic circuit diagram showing still another embodiment of reference voltage generating means used in a driver IC of the present invention.

FIGS. 11 to 13 show the VG voltage generating means used in the driver IC of the present invention.

FIG. 11 shows an example in which the VG voltage is generated by a bipolar transistor 310, resistors R10 and R20 and a constant current source 320. This constant current source 320 causes a current to flow through the resistors R10 and R20. When the voltage of the resistor R10 exceeds the built-in voltage VBE (about 0.7 V) between the base-emitter of the bipolar transistor 310, this transistor 310 is turned on, so that the voltage of the resistor R10 is clamped at VBE. By selecting a proper resistance ratio between the resistors R10 and R20, therefore, the voltage can be set to a predetermined level. For example, when VBE=0.7 V and R10=1 KΩ, a voltage lower by 21 V than the voltage HV is generated as the voltage VG by setting the resistor R10=20 KΩ.

FIG. 12 shows an example in which the VG voltage is generated by a PMOS transistor 311, the resistors R10 and R20 and the constant current source 320. If the threshold voltage Vth of the transistor 311 is set at −1 V, the voltage of the resistor R10 is determined to be about 1 V. By selecting an appropriate value of the resistor R20, therefore, the voltage can also be set at a predetermined level, as in the example of FIG. 11.

FIG. 13 shows an example in which the VG voltage is generated by a Zener diode 312, the resistors R10 and R20 and the constant current source 320. The voltage VG is generated at a level lower by 21 V than the voltage HV by setting the Zener voltage at 7 V and by connecting three Zener diodes in series.

Here, the constant current source 320 is so constructed as to include an N-transistor and a resistor connected with the source of the transistor, and its current is produced by selecting an appropriate resistance of the resistor to adjust the gate-source voltage of the transistor.

(Embodiment 10)

Figure 14:
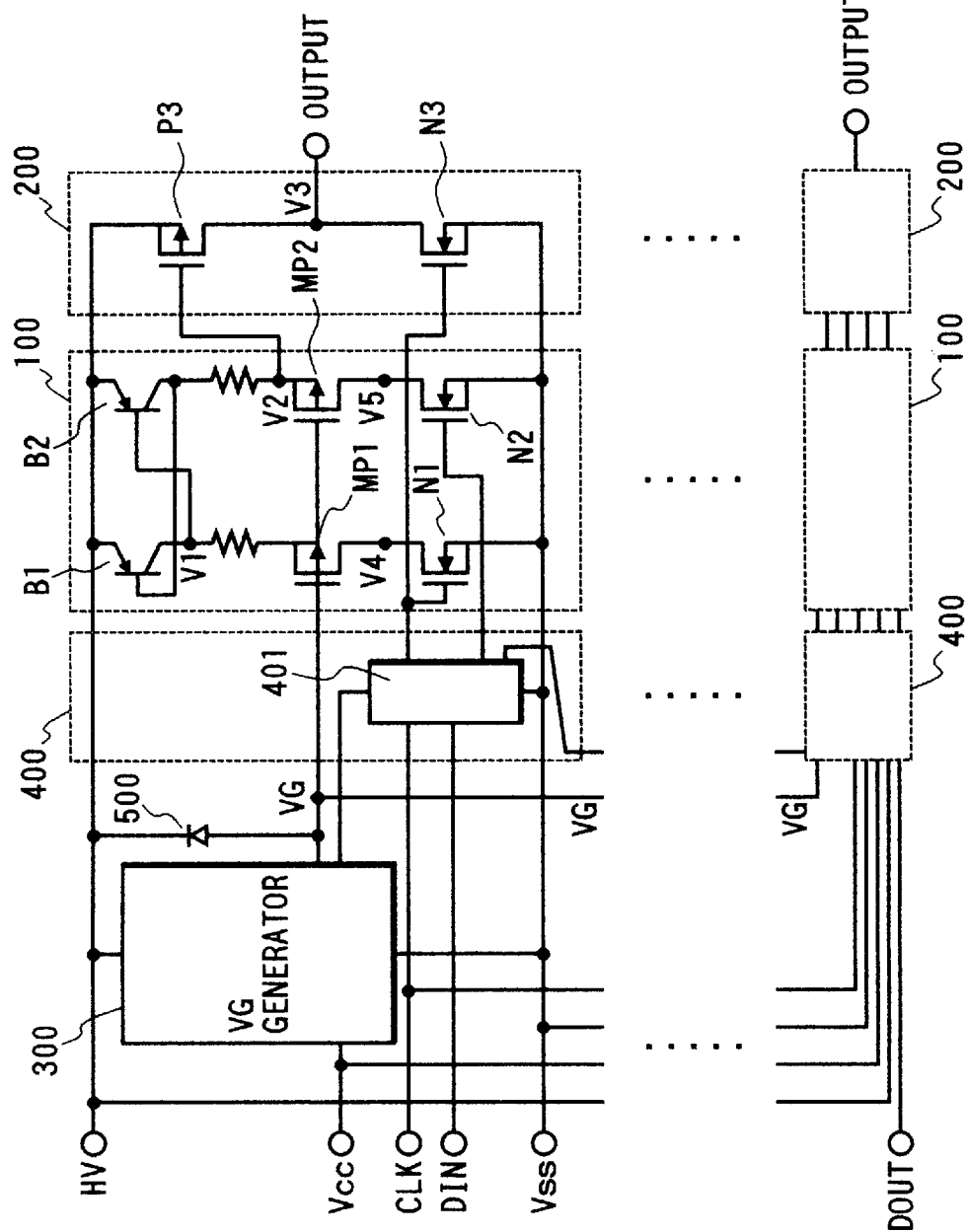
FIG. 14 is a schematic circuit diagram showing the configuration of a level shift and output driver unit of a tenth embodiment of the present invention.

In the driver circuit of FIG. 14, the first and second MOS transistors P1 and P2 of the seventh embodiment are replaced by first and second bipolar transistors B1 and B2. The operations of the circuit are basically similar to those of the seventh embodiment.

(Embodiment 11)

Figure 15:
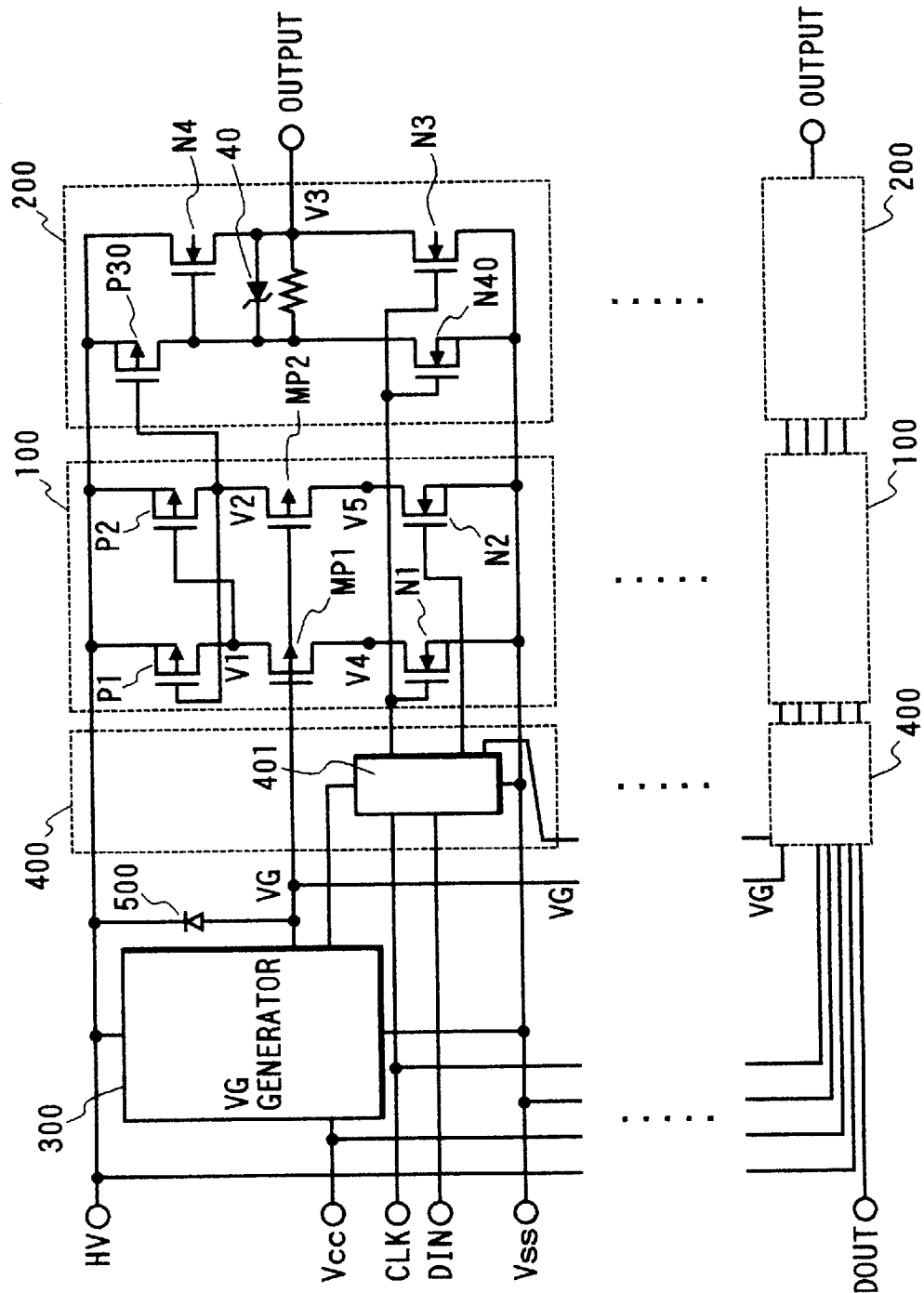
FIG. 15 is a schematic circuit diagram showing a modification of the output driver section of the seventh embodiment of the present invention.

FIG. 15 shows a modification of the output driver circuit of the seventh embodiment. The final stage of the output driver has NMOS transistors N4 and N3 for both the pull-up and pull-down operations. A Zener diode 40 is connected between the gate and source of the transistor N4, so that no higher voltage than a predetermined voltage (e.g., 6 V) is applied between the gate and the source. Transistors P30 and N40 determine the on/off operation of the NMOS transistor N4 by charging/discharging the gate capacity of the transistor N4 on the pull-up side.

(Embodiment 12)

Figure 16:
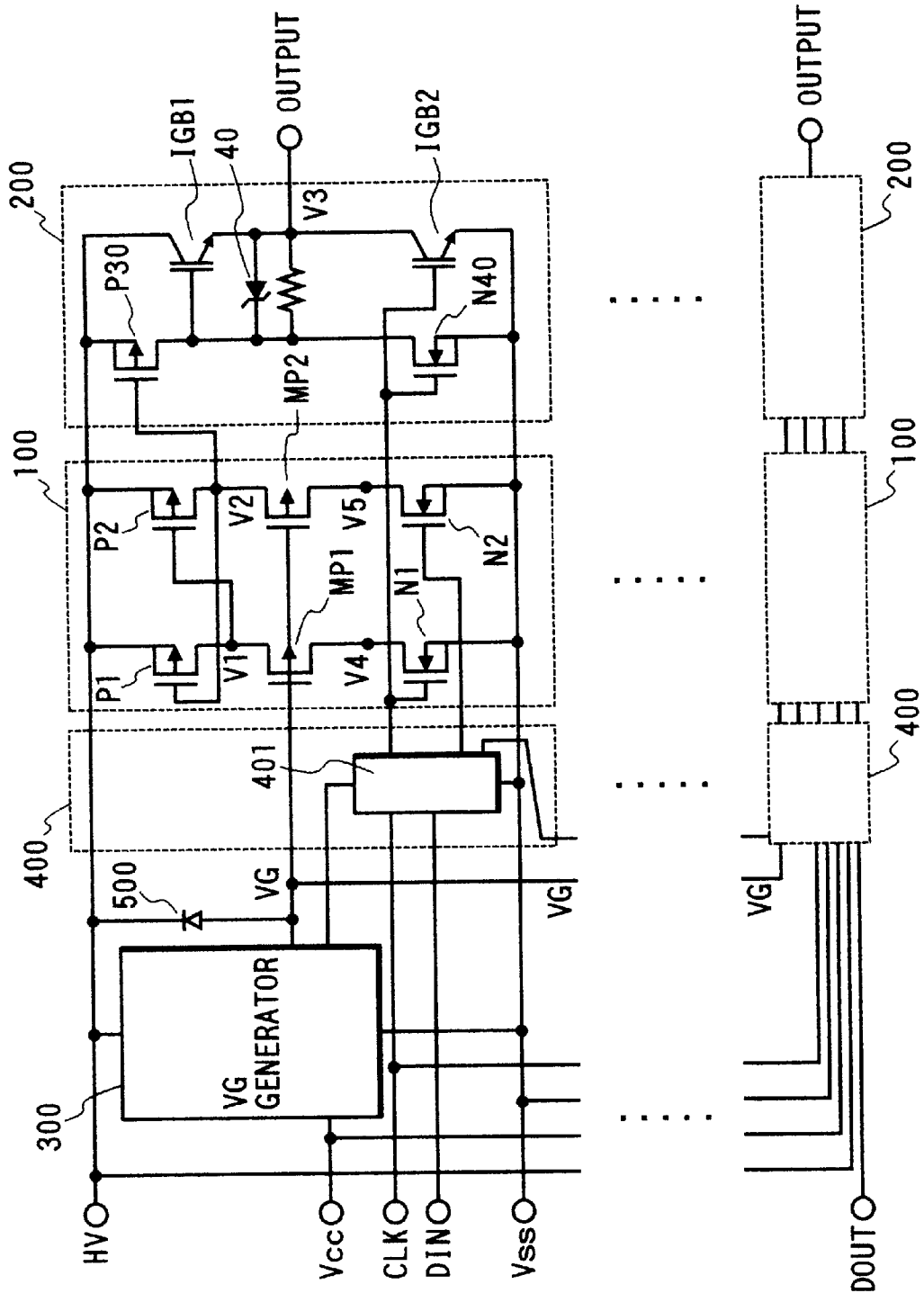
FIG. 16 is a schematic circuit diagram showing another modification of the output driver section of the seventh embodiment of the present invention.

FIG. 16 shows another modification of the output driver circuit of the seventh embodiment of the present invention in which insulated-gate bipolar transistors IGB1 and IGB2 are used at the final stage of the output driver. By using insulated-gate bipolar transistors having higher load driving abilities than those of the MOS transistors, the element sizes can be made smaller for the same current than the MOS transistors.

(Embodiment 13)

Figure 17:
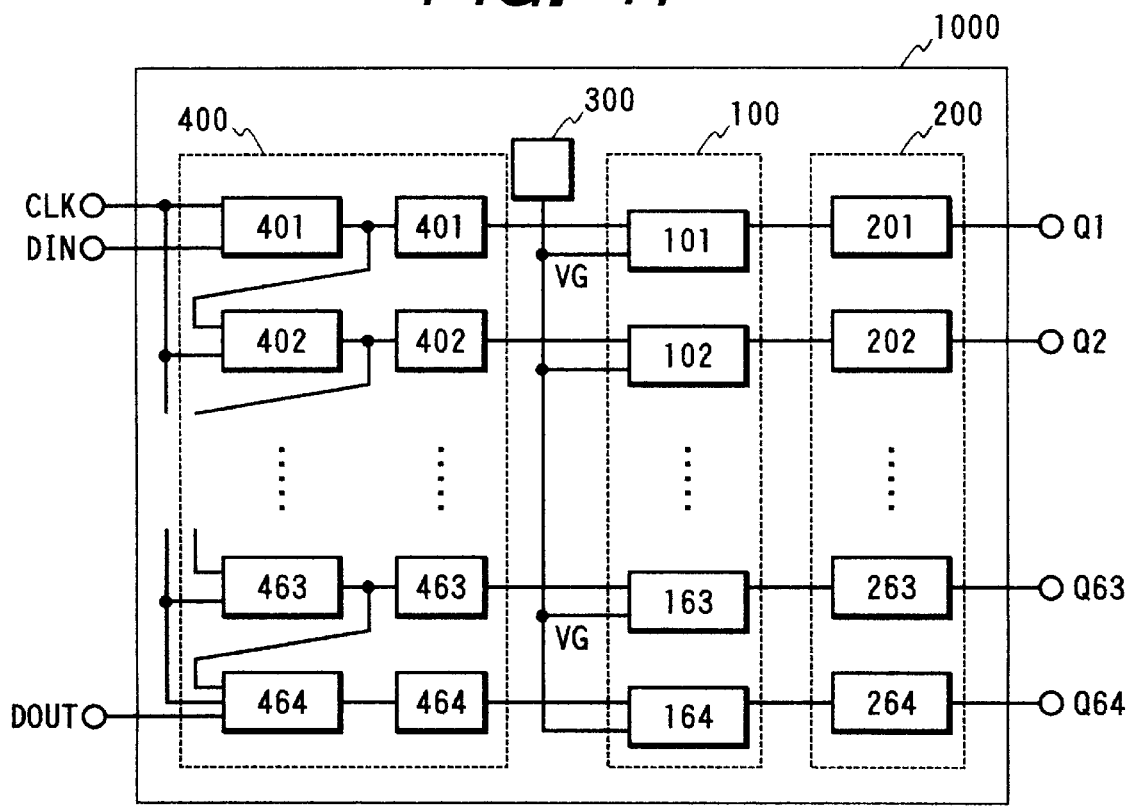
FIG. 17 is a block diagram showing the driver IC of the present invention.

FIG. 17 is a block diagram showing a driver IC using the level shift circuit of the present invention. Reference numeral 1000 designates a driver IC; symbols Q1 to Q64 denotes output signals for driving the loads; symbol CLK denote the clock signal; symbol DIN denote the input data signal; and symbol DOUT denote an output signal for transmitting the data signal to a next driver IC. Sixty four circuits are provided in total for the level shift and data latch circuit 400, the level shift circuit 100, and the output driver circuit 200 for the output signals Q1 to Q64, but only one circuit of the VG voltage generating means is sufficient for one driver IC.

The VG generating circuit 300 is provided in a chip in the embodiments thus far described, but the VG voltage may be fed from an external power source. In this modification, the VG generating circuit 300 need not be provided in the chip.

(Embodiment 14)

Figure 18:
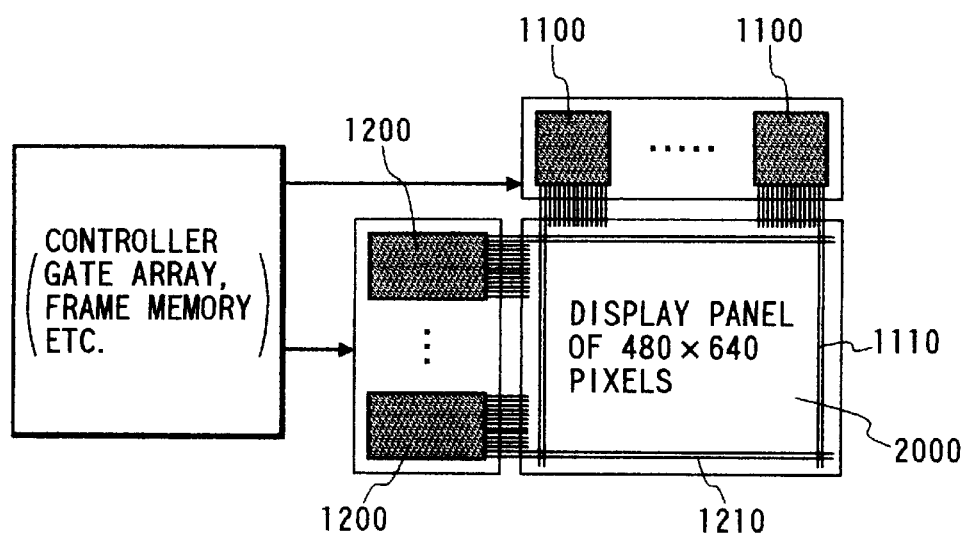
FIG. 18 is a diagram showing a display device using the driver IC of the present invention.

FIG. 14 is a diagram of a driver IC of the present invention which is used as the driver IC for driving an EL (Electro Luminescence), LED (Light Emitting Diode), plasma or liquid crystal display panel. Reference numeral 2000 designates a VGA color display panel of 480×640 (×3) pixels; numeral 1100 denotes a data (or address) driver IC; numeral 1200 denotes a scan driver IC; numeral 1110 denotes an address electrode wiring line; and numeral 1210 denotes a display electrode wiring line. For simplicity, what is shown in FIG. 18 is the wiring line of only the peripheral portion of the panel, but not any cell. The circuit block constructions of the data driver IC 1100 and the scan driver IC 1200 are identical to that of the driver IC 1000 shown in FIG. 17. Assuming that the numbers of output bits of the data and scan driver ICs are sixty four, thirty data driver ICs and eight scan driver ICs are used. These drivers are used to charge/discharge the parasitic capacitors of the (not-shown) cells, and the electrode wiring capacitors. The number of driver ICs used in the display panel will be increased the more by future miniaturization, so that the power consumption of the panel can be reduced by lowering the power consumption of the driver ICs.

Figure 19:
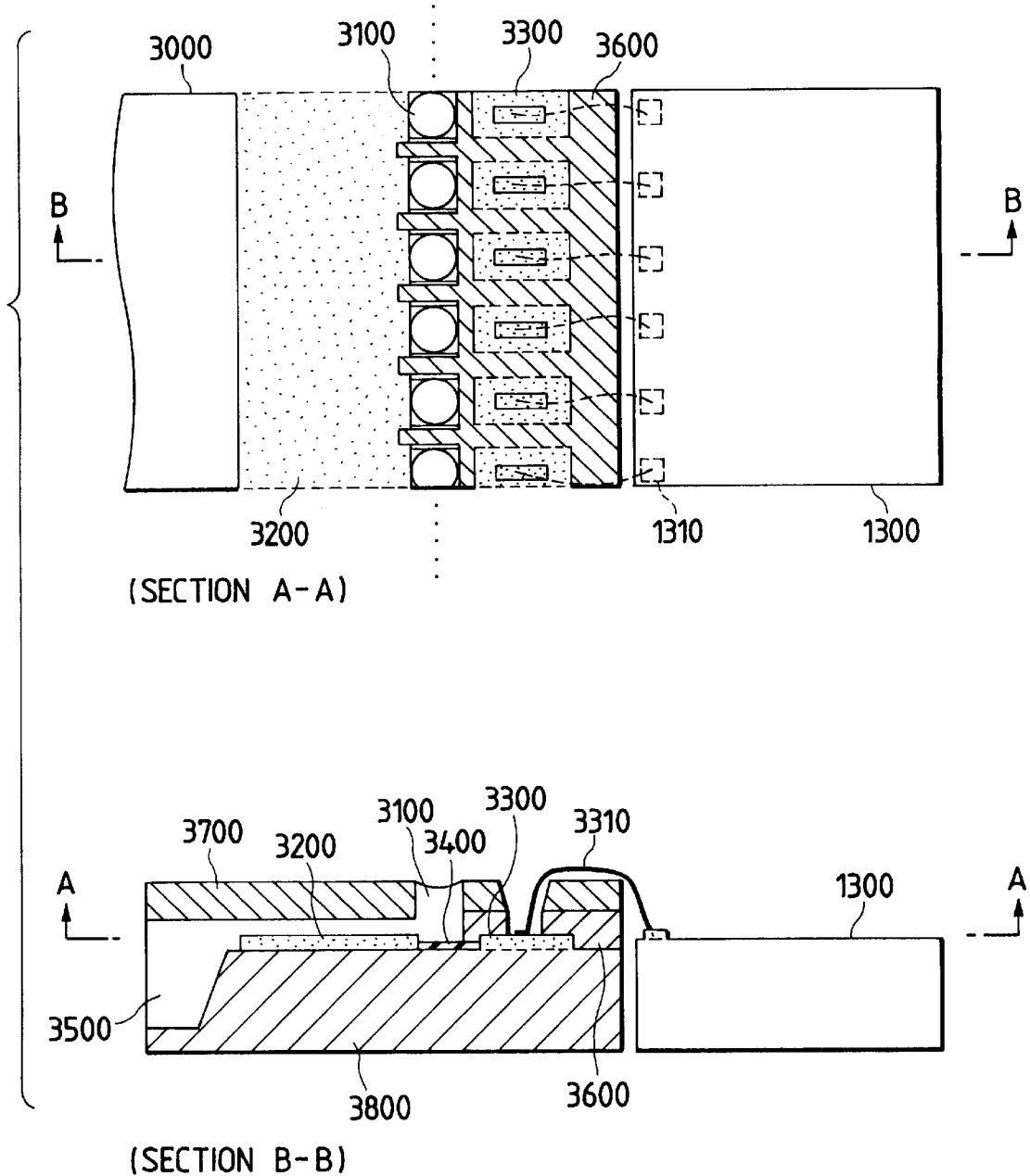
FIG. 19A is a top plan view showing a printer device using the driver IC of the present invention.
FIG. 19B is a section taken along line B—B in FIG. 19A.

FIG. 19 is a diagram showing the periphery of a head portion of the case in which the driver IC of the present invention is used in an ink jet printer device.

Reference numeral 3000 designates the head portion of an ink jet printer; numeral 3100 denotes a nozzle; numeral 3200 a common electrode; numeral 3300 an individual electrode; numeral 3400 denotes a heater; numeral 3500 denotes an ink groove; numeral 3600 denotes a partition for partitioning the nozzles; numeral 3700 denotes an orifice plate; numeral 3800 denotes a silicon substrate; and numeral 1300 denotes the driver IC of the present invention. There are also included at least a level shift circuit 100, an output driver circuit 200 and a VG generating circuit 300 described in the former embodiments of the present invention. Moreover, signal outputting bonding pads 1310 of the driver IC 1300 are connected to the individual electrode 3300 of the head portion by bonding wires 3310. In the present embodiment, the heater 3400 is a main load for driving the driver IC.

When the output voltage of the driver IC 1300 is at a high level, the voltage is applied to the individual electrodes 3300. When the current flows through the heater connected between the common electrode 3200 and each electrode 3300, to heat the heater, the ink with which the nozzle 3100 is filled is thermally expanded and jetted.

By using the driver IC of the present invention, the power consumption of the ink jet printer device can be reduced.

(Embodiment 15)

Figure 20:
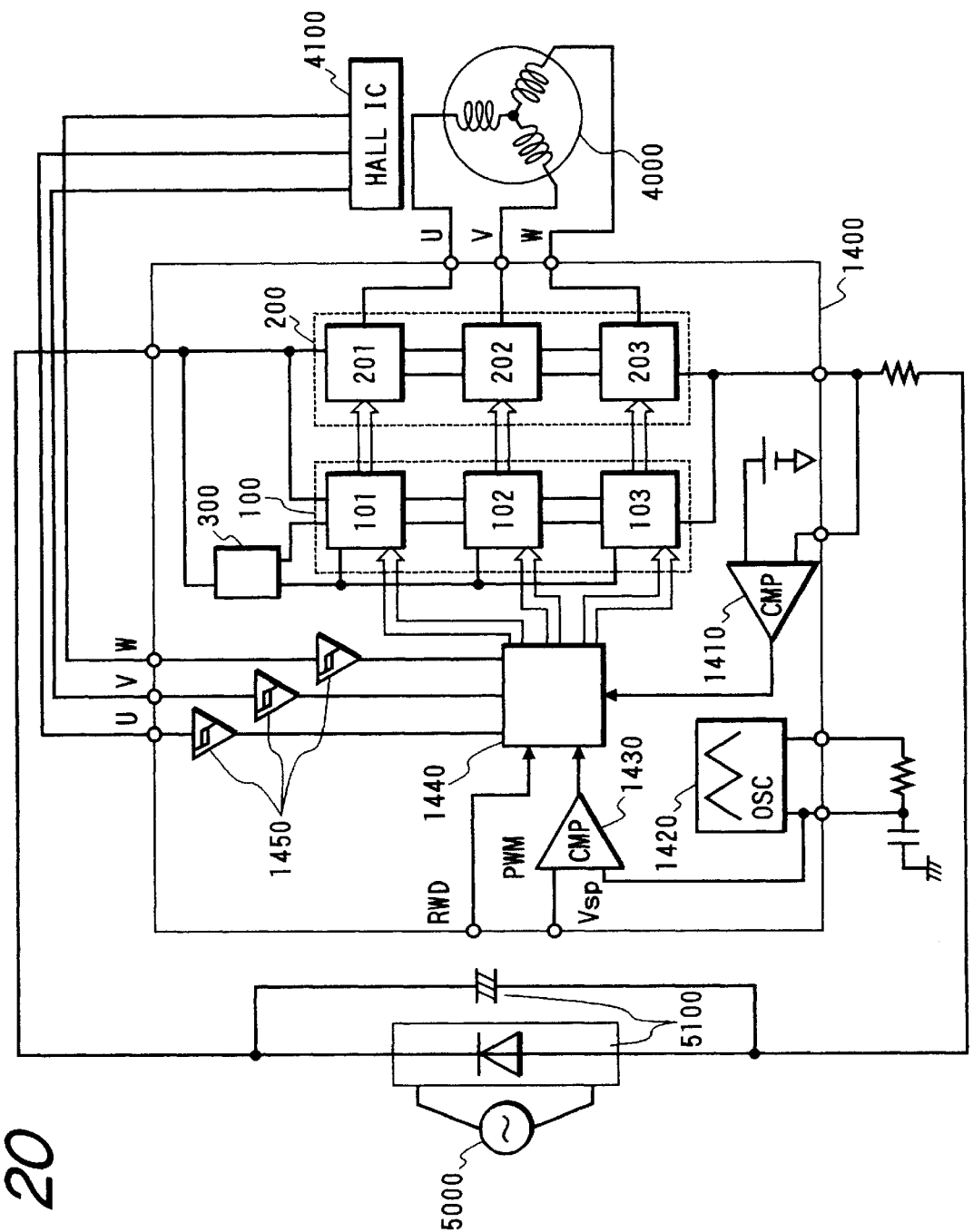
FIG. 20 is a block diagram showing a motor device using the driver IC of the present invention.
Figure 21:
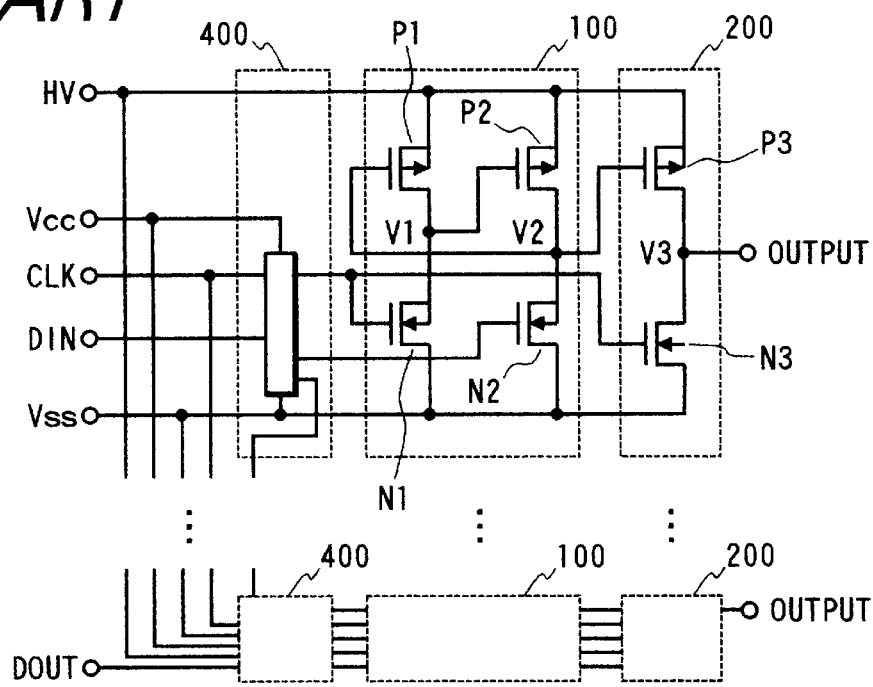
FIG. 21 is a schematic circuit diagram showing a level shift and output driver section used in the driver IC of the prior art.
Figure 22:
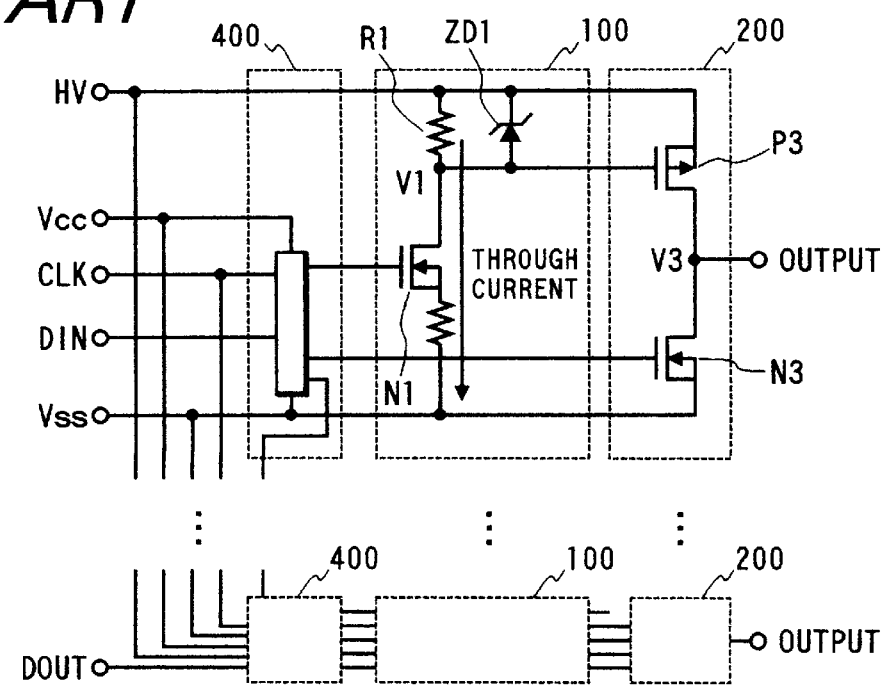
FIG. 22 is a schematic circuit diagram showing another arrangement of the level shift and output driver section used in the driver IC of the prior art.

FIG. 20 is a diagram showing the case in which the driver IC of the present invention is used in a motor device.

Reference numeral 4000 designates a DC brushless motor; numeral 4100 a Hall IC; numeral 5000 denotes an AC power source; and numeral 5100 denotes a rectifier. Numeral 1400 designates a driver IC of the present invention, in which there are integrated into one chip an output driver circuit 200 or a drive circuit unit using high-voltage power elements, a level shift circuit 100, a VG generating circuit 300, and a logic control unit using low-voltage elements. Numerals 1410 and 1430 designate comparators; numeral 1420 denotes an oscillator; and numeral 1440 denotes a three-phase distributor. The present driver IC can be built in the motor device.

In the control of the brushless motor, as shown, the transistors N3 and IGB2 of the lower arm are driven with a frequency of about 20 KHz, and the transistors P3, N4 and IGB1 are driven with a frequency of 100 KHz or lower. The motor speed is made variable by subjecting the lower arm to pulse width modulation (PWM). Specifically, the signal representing the magnetic pole position of the motor detected by the Hall IC is received by the driver IC 1400 to change the phases U, V and W, and the speed of the motor is detected from the output signal of the Hall IC by a (not-shown) motor controlling microcomputer, so that a comparison signal VSP representing the result of comparison of the speed with a speed command is transmitted to the driver IC 1400. This driver IC 1400 determines the pulse width of the lower arm by comparing the signal VSP and the PWM controlled carrier signal.

Although the foregoing description is directed to the case in which the present invention is applied to driver ICs for driving a display device, an ink jet printer device and a motor device, the present invention should not be limited to the driver ICs for those electric devices, but can be applied to driver ICs for a facsimile device, an LED, a liquid crystal printer, or an electronic device using inverter control, such as an inverter illuminating device.

According to the present invention, it is possible to reduce the power and current consumption of the driver circuit. Since the power consumption of the driver IC is reduced, the heat generation of the driver IC can be suppressed.

According to the present invention, moreover, the gate oxide films need not be resistant to high voltages, and the driver IC can be easily manufactured. Still moreover, no through current steadily flows at the time of outputting a high-level voltage, so that the power consumption of the high-voltage power IC of multi-bit output is reduced.

What is claimed is:

1. A driver circuit comprising a first switching element and a second switching element which are totem-pole-connected,
    wherein said totem pole connection is connected at its one end, a node and its other end to a power source, an output to a load and a reference potential, respectively,
    wherein said first switching element is connected between said one end and said node,
    wherein said second switching element is connected between said node and said other end,
    wherein a circuit including a third switching element is connected between the one end of said totem pole connection and the control terminal of said first switching element, the third switching element having a control terminal for a control signal,
    wherein a fourth switching element is connected between the control terminal of said first switching element and the other end of said totem pole connection,
    wherein said second and fourth switching elements have a common control terminal for another control signal, and
    wherein a diode is connected between the control terminal of said first switching element and said node.

2. A driver circuit according to claim 1,
    wherein in said circuit including said third switching element, a resistor is connected in series with said third switching element.

3. A driver circuit according to claim 1,
    wherein a floating power source is connected between said third switching element and the one end of said totem pole connection.

4. A driver circuit according to claim 1,
    wherein said first switching element and said second switching element are insulated-gate bipolar transistors, and
    wherein said fourth switching element is a MOS transistor.

5. A driver circuit according to claim 1, wherein said first switching element switches from on to off when said second and fourth switching elements switch from off to on by said another control signal during a time when said third switching element is turned on by said control signal.

6. A driver circuit according to claim 1 or 5, wherein said first switching element is off and said second and fourth switching elements are on when said third switching element is off.

7. A display device according to claim 1, wherein said control signal provided to said third switching element is provided from a level shift circuit having an output coupled to said control terminal of said third switching element.

8. A display device comprising a display panel including:
    a plurality of scanning side electrodes;
    a plurality of data side electrodes; and
    a plurality of display pixels connected between said plurality of scanning side electrodes and said plurality of data side electrodes,
    wherein said plurality of scanning side electrodes are connected with the outputs of a plurality of driver circuits,
    wherein each of said driver circuits comprises a first switching element and a second switching element which are totem-pole-connected,
    wherein said totem pole connection is connected at its one end, a node and its other end with a power source, an output to a load and a reference potential, respectively,
    wherein said first switching element is connected between said one end and said node,
    wherein said second switching element is connected between said node and said other end,
    wherein a circuit including a third switching element is connected between the one end of said totem pole connection and the control terminal of said first switching element, the third switching element having a control terminal for a control signal,
    wherein a fourth switching element is connected between the control terminal of said first switching element and the other end of said totem pole connection,
    wherein said second and fourth switching elements have a common control terminal for another control signal, and wherein a diode is connected between the control terminal of said first switching element and said node.

9. A display device according to claim 8, wherein said control signal provided to said third switching element is provided from a level shift circuit having an output coupled to said control terminal of said third switching element.

* * * * *